US010043084B2

(12) United States Patent
Zhou et al.

(10) Patent No.: US 10,043,084 B2
(45) Date of Patent: Aug. 7, 2018

(54) HIERARCHICAL CONTEXT-AWARE EXTREMITY DETECTION

(71) Applicant: TOYOTA JIDOSHA KABUSHIKI KAISHA, Toyota-shi, Aichi-ken (JP)

(72) Inventors: Tian Zhou, West Lafayette, IN (US); Preeti Pillai, Sunnyvale, CA (US); Veeraganesh Yalla, Mountain, CA (US)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 15/167,931

(22) Filed: May 27, 2016

(65) Prior Publication Data
US 2017/0344838 A1    Nov. 30, 2017

(51) Int. Cl.
| G06K 9/00 | (2006.01) |
| G06T 7/00 | (2017.01) |
| H04N 5/225 | (2006.01) |

(52) U.S. Cl.
CPC ..... G06K 9/00845 (2013.01); G06K 9/00355 (2013.01); G06K 9/00389 (2013.01); G06T 7/0046 (2013.01); G06T 2207/20024 (2013.01); G06T 2207/20076 (2013.01); G06T 2207/30196 (2013.01); G06T 2207/30244 (2013.01); G06T 2207/30268 (2013.01); G06T 2210/12 (2013.01)

(58) Field of Classification Search
USPC ........ 382/100, 103–104, 106–107, 155, 162, 382/168, 173, 181, 199, 209, 219, 224, 382/232, 254, 274, 276, 286–291, 305, 382/312; 348/169
See application file for complete search history.

(56) References Cited

U.S. PATENT DOCUMENTS

| 9,096,262 B2 * | 8/2015 | Urhahne .............. B62D 15/025 |
| 9,248,851 B2 * | 2/2016 | Van'tZelfde ........... B62D 1/046 |

(Continued)

FOREIGN PATENT DOCUMENTS

| JP | 2005165923 A | 6/2005 |
| JP | 2013257830 A | 12/2013 |
| WO | 2013117787 A1 | 8/2013 |

OTHER PUBLICATIONS

Mittal et al., "Hand Detection Using Multiple Proposals," 2011 (11 pages).

(Continued)

*Primary Examiner* — Seyed Azarian
(74) *Attorney, Agent, or Firm* — Patent Law Works LLP

(57) ABSTRACT

In an example embodiment, a computer-implemented method receives image data from one or more sensors of a moving platform and detecting one or more objects from the image data. The one or more objects potentially represent extremities of a user associated with the moving platform. The method processes the one or more objects using two or more context processors and context data retrieved from a context database. The processing produces at least two confidence values for each of the one or more objects. The method filters at least one of the one or more objects from consideration based on the confidence value of each of the one or more objects.

15 Claims, 14 Drawing Sheets
(2 of 14 Drawing Sheet(s) Filed in Color)

(56) References Cited

U.S. PATENT DOCUMENTS

| | | | |
|---|---|---|---|
| 2016/0063727 A1* | 3/2016 | Gao | G06K 9/00335 |
| | | | 382/103 |
| 2016/0267325 A1* | 9/2016 | Sundaresan | G06K 9/00624 |
| 2016/0379064 A1* | 12/2016 | van Beek | G06K 9/00798 |
| | | | 382/104 |

OTHER PUBLICATIONS

Ohn-Bar et al., "In-Vehicle Hand Activity Recognition Using Integration of Regions," Jun. 23, 2013, IEEE Intelligent Vehicles Symposium (6 pages).

Das et al., "On Performance Evaluation of Driver Hand Detection Algorithms: Challenges, Dataset, and Metrics," 2015, IEEE 18th International Conference on Intelligent Transportation Systems (6 pages).

Zhou et al., "Hierarchical Cotext-Aware Hand Detection Algorithm for Naturalistic Driving," 2016 IEEE 19th International Conference on Intelligent Transportation Systems (ITSC), Nov. 1, 2016 (7 pages).

Mitsuhashi et al., "Detecting human-object interactions in crowded environment," The Institute of Electronics, Information and Communication Engineers and Information Processing Society of Japan, 2014 (2 pages).

\* cited by examiner

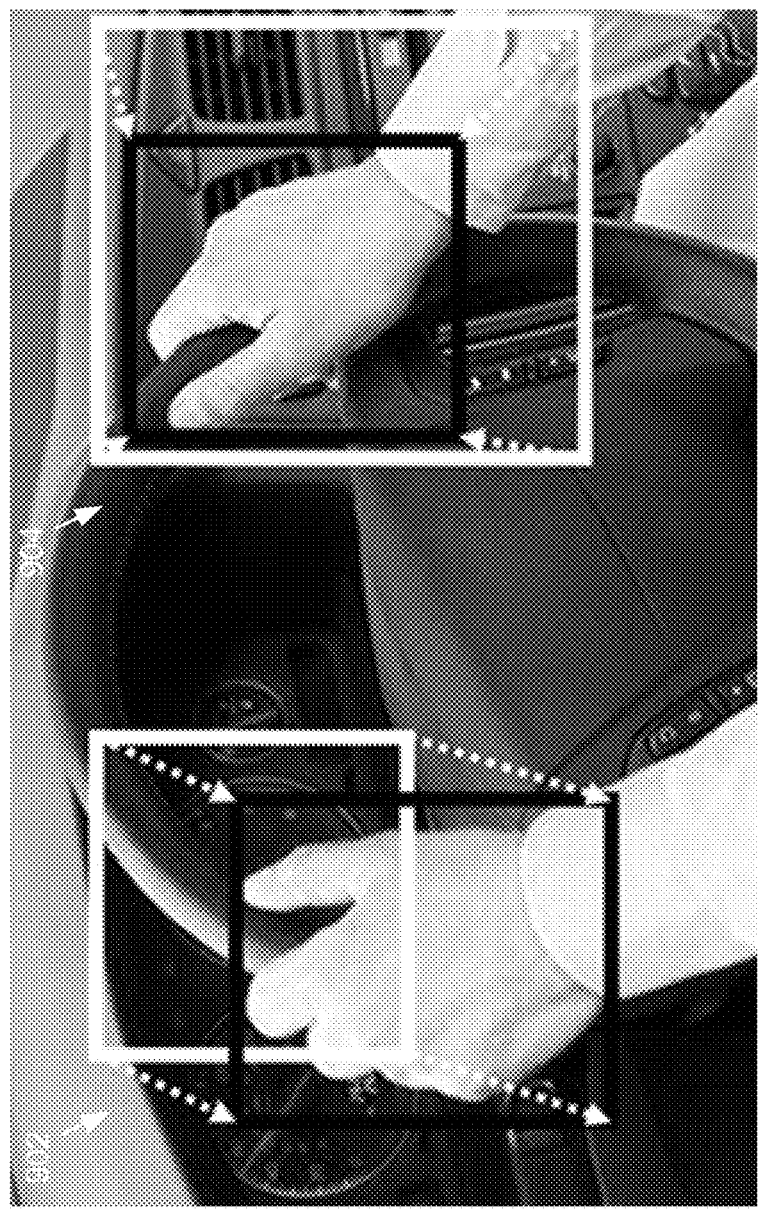
Figure 9

Algorithm 1 Spatial Model Generation
1: Input: training images $D$, window shrink factor $\gamma_w$, spatial model shape ($w_0 = 640, h_0 = 480$).
2: $M_s \leftarrow zeros(h_0, w_0)$ ▷ init spatial model with zeros
3: for all $img$ in $D$ do ▷ for each training image
4:      $w_i, h_i = getShape(img)$ ▷ get width and height
5:      $hands \leftarrow getHands(img)$ ▷ get ground truth hands
6:      for all $hand$ in $hands$ do ▷ for each hand
7:          $[x, y, w, h] \leftarrow hand$ ▷ extract bounding box info
8:          $x_n = x/w_i \cdot w_0, y_n = y/h_i \cdot h_0$ ▷ normalize x,y
9:          $w_n = w/w_i \cdot w_0, h_n = h/h_i \cdot h_0$ ▷ normalize w,h
10:          $l = max(0, x_n - w_n/\gamma_w)$ ▷ left index
11:          $r = min(w_0, x_n + w_n/\gamma_w)$ ▷ right index
12:          $t = max(0, y_n - h_n/\gamma_w)$ ▷ top index
13:          $b = min(h_0, y_n + h_n/\gamma_w)$ ▷ bottom index
14:          $M_s[t:b, l:r] += 1$ ▷ update spatial model
15:      end for
16: end for
17: $\overline{M_s} = \frac{M_s - mean(M_s)}{std(M_s)} + 1$ ▷ normalize spatial model
18: return $\overline{M_s}$

Figure 11

HIERARCHICAL CONTEXT-AWARE EXTREMITY DETECTION

BACKGROUND

The present disclosure relates to object detection.

Human activity understanding by machines is important for reliable human-machine interaction and human behavior prediction. In vehicles, for example, accurately interpreting driver activity, such as interactions between the user's hands and objects in the vehicle (e.g., cellphones, coffee cups, cigarettes, controls, compartments, etc.) would allow for many improvements in vehicle safety and performance. However, configuring a machine to understand human activity is not a trivial endeavor and various existing solutions, such as existing touch-based and vision-based systems, are unsuitable for dynamic environments where real-time detection may be needed because they are too slow or computationally expensive (requiring expensive hardware upgrades to function properly).

Some approaches detect a driver's hands when placed on a steering wheel. These systems may use touch-based hand detection, which can identify the presence and location of driver's hands on the steering wheel. In some cases, a sensor mat may be used that includes multiple sensor loops arranged on the steering wheel to achieve multiple sensing zones. However, these approaches are limited since they generally can only detect the driver's hands when they are placed on the steering wheel, and fail to detect the driver's hands when in other locations during operation of the vehicle, such as moving in the air, placed on lap, etc. Further, in general these approaches are unable to differentiate hands from other moveable body parts.

Some approaches use vision-based hand detection algorithms. For instance, Mittal, Arpit, Andrew Zisserman, and Philip Torr, "Hand Detection Using Multiple Proposals," *Proceedings of the British Machine Vision Conference* 2011 (2011), describe a vision-based hand detection algorithm that uses a camera to capture an image of the scene. The algorithm is capable of identifying the hands present in the image. In particular, three hand detectors are used to respectively determine 1) texture information to capture the shape of the hand; 2) context information to capture nearby body parts like a forearm; and 3) color information to capture the distinctive skin color. The output of these detectors is combined to make a final determination. However, the algorithm is limited because it is unable to provide any information about the interaction between the driver's hands and car components. Additionally, the algorithm is heavily color and texture based, and as a result, is unable to suitably function in more difficult or changing lighting conditions, such as when the hands are occluded or significantly deformed. The algorithm is also comparatively slow, as each image requires about 2 minutes of processing time, which is unsuitable for dynamic, real-time systems, such as those used in cars and other vehicles.

Another approach, such as that described by Ohn-Bar, Eshed, and Mohan Trivedi, "In-vehicle Hand Activity Recognition Using Integration of Regions," 2013 *IEEE Intelligent Vehicles Symposium (IV)* (2013), proposes a vision-based Region-Of-Interest (ROI) hand detection algorithm for in-vehicle hand activity recognition. By using color, texture, and global statistic features on the color and depth image, the algorithm can determine the number of hands present in each fixed ROI. However, the algorithm is unable to provide the refined location of the hand within each ROI, due to its ROI-based nature. Also, as with other solutions, it is heavily color and texture based and unable to suitably function in more difficult or changing lighting conditions. Further, the algorithm utilizes a fixed ROI-configuration, from a fixed viewpoint (behind the driver's head), and has a large footprint from the Kinect™ sensor being used, which makes it difficult to generalize to other sensor configurations and vehicle types (e.g., a different steering wheel shape). The algorithm also runs at a relatively slow frame rate of about 2 FPS, which is unsuitable for dynamic, real-time systems, such as those used in cars and other vehicles.

Some further approaches use a sliding window technique to perform hand detection. For example, Das, Nikhil, Eshed Ohn-Bar, and Mohan M. Trivedi, "On Performance Evaluation of Driver Hand Detection Algorithms: Challenges, Dataset, and Metrics," 2015 *IEEE 18th International Conference on Intelligent Transportation Systems* (2015), describe a baseline algorithm that leverages color and texture features and a sliding window detection framework, which can give locations of hands in forms of a fitted bounding box. While the dataset used by the algorithm attempts to address challenges that are observed in naturalistic driving settings, due to its heavy color based nature, the algorithm is unable to effectively differentiate hands from other body parts (e.g., faces, forearms, etc.) that generally have the same color. Further, as with other solutions, the algorithm fails to accommodate difficult lighting conditions or significant lighting changes that may deform or occlude hands. Further, the algorithm, and the other above-discussed solutions, are configured to utilize high-level, generalized information about the road which lacks granularity. As a result, these solutions are unable to account for finer roadway detail, such as fine-grained (e.g., street level) detail, when a driver is presented with a particular driving situation.

SUMMARY

According to one innovative aspect of the subject matter described in this disclosure, a system includes one or more processors and one or more memories storing instructions that, when executed by the one or more processors, cause the system to perform operations comprising: receiving image data from one or more sensors of a moving platform; detecting one or more objects from the image data, the one or more objects potentially representing extremities of a user associated with the moving platform; processing the one or more objects using two or more context processors and context data retrieved from a context database, the processing producing at least two confidence values for each of the one or more objects; and filtering at least one of the one or more objects from consideration based on the confidence value of each of the one or more objects.

In general, another innovative aspect of the subject matter described in this disclosure may be embodied in methods that include receiving image data from one or more sensors of a moving platform; detecting one or more objects from the image data, the one or more objects potentially representing extremities of a user associated with the moving platform; processing the one or more objects using two or more context processors and context data retrieved from a context database, the processing producing at least two confidence values for each of the one or more objects; and filtering at least one of the one or more objects from consideration based on the confidence value of each of the one or more objects.

Another innovative aspect of the subject matter described in this disclosure may be embodied in methods that include receiving an initial extremity proposal including proposed extremities detected from an image captured by one or more sensors; ranking, in a first instance, the proposed extremities based on dimensions of the proposed extremities; ranking, in a second instance, the proposed extremities based on locations of the proposed extremities within the image; ranking, in a third instance, the proposed extremities using mutual voting; ranking, in a fourth instance, the proposed extremities responsive to receiving CAN data associated with at least one of the proposed extremities; and aggregating confidence values associated with the ranking of the first instance, the second instance, the third instance, and the fourth instance; and outputting a filtered proposal including a subset of the proposed extremities based on the aggregated confidence values.

These and other implementations may each optionally include one or more of the following features and/or operations. For instance, the features and/or operations include: that the two or more context processors include two or more of: a processor executable to fit a bounding box to each of the one or more objects and determine a confidence value for each of the one or more objects based on the bounding box, a processor executable to determine a confidence value for each of the objects based on a location of each of the objects within the image, a processor executable to determine a confidence value for each of the objects using mutual voting, and a processor executable to determine a confidence value for each of the objects based on CAN data received at time corresponding to the image data; estimating a sensor location associated with the one or more sensor from the image data; retrieving the context data from the context database using the sensor location; that estimating the sensor location includes extracting color features and texture features from the image data, using a discriminative model to determine one or more location probabilities for the one or more objects, and determine a sensor location based on the one or more location probabilities; that the sensor location includes a probability for a sensor position; refining a location of a bounding box associated with an unfiltered object; that filtering the at least one of the one or more objects from consideration includes computing an aggregated confidence value for each of the one or more objects using the at least two confidence values for each of the one or more objects, and comparing the aggregated confidence value of each of the one or more objects to a predetermined threshold; and providing one or more of an auditory instruction, a visual instruction, and a tactile instruction to the user via one or more output devices of a vehicle based on an output determined based on the filtering.

Other aspects include corresponding methods, systems, apparatus, and computer program products for these and other innovative aspects.

As a further example, the technology includes a system for hierarchical context-aware extremity (e.g., hand) detection for a naturalistic driving setting. The system may include context prior estimation (e.g., viewpoint detection), context-aware extremity detectors, and post-processing to fine-tune extremity locations (e.g., bounding box regression). Explored context cues may include prevalent extremity (e.g., hand) shapes and locations, driver habit(s), and joint-spatial distribution between extremities. Advantageously, the confidences from various context channels may be aggregated together. In an example use case, the system evaluated sample data, such as a public VIVA hand dataset, and demonstrated detection results that significantly outperform the various solutions described in the Background section.

The novel technology presented in this disclosure is particularly advantageous in a number of respects. For example, the technology provides a comprehensive solution that can detect extremities in-cabin, such as hands, in a dynamic, real-time, environment having a wide range of conditions (e.g., lighting conditions). The technology can detect and localize moving hands of the driver, whether or not the hands are in contact with the vehicle components or external objects. Further, the technology does not require the driver's hands be in contact with the steering wheel of the vehicle, can accurately localize each hand of the drive, is efficient (e.g., can operate at 15 FPS or faster) and can detect extremities dynamically, in real-time on existing computing hardware (without requiring hardware upgrades), considers contextual features of the vehicle to provide higher-resolution, more accurate hand detection, is not restricted to certain image regions of interest, is capable of detecting obscured and/or occluded extremities, can improve detection by considering multiple in-vehicle contexts from multiple viewpoints, and can be applied to multiple applications, including driver activity recognition, distraction detection, and advanced driving assistance systems.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 depicts an example image annotated to show adaptation of two bounding boxes.

FIG. 11 depicts an example spatial model algorithm.

DESCRIPTION

The technology described herein can detect and interpret extremity activity of a human, such as vehicle operator, such as a driver, and generate and provide feedback based thereon. While the embodiments discussed herein relate to a person's hands, an extremity may include a person's leg, neck, head, torso, implement, or other natural or synthetic appendage, etc. As described herein, the technology includes a context-aware framework that is capable of capturing relevant contextual information of a given vehicle and its driver and use it to localize moving extremities of the driver. In some embodiments, the contextual information may be captured in a hierarchical manner.

The technology is capable of detecting a driver's extremities, such as hands, in a variety of states, such as stationary hands, moving hands, hands using vehicle controls, occluded hands, hands in the presence of occlusion, etc. The technology can semantically recognize extremities and differentiate them from other body parts such as face or forearm, and may operate in variety of outside lighting conditions, hand deformations, occlusions, and varying cabin interior environment conditions. The algorithms used by the technology may operate dynamically, in real-time, and monitor the operator continually with increased accuracy and robustness in comparison to other solutions.

Further, while the technology is described within the context of vehicles, it can be extended and is suitable for other domains that can benefit from accurate and robust extremity detection. Example domains may include an operating room, cockpit, a control room, etc. In many cases, these domains may be upgraded to include the aspects described herein without substantially changing the hardware or software infrastructure of those domains.

Figure 1:
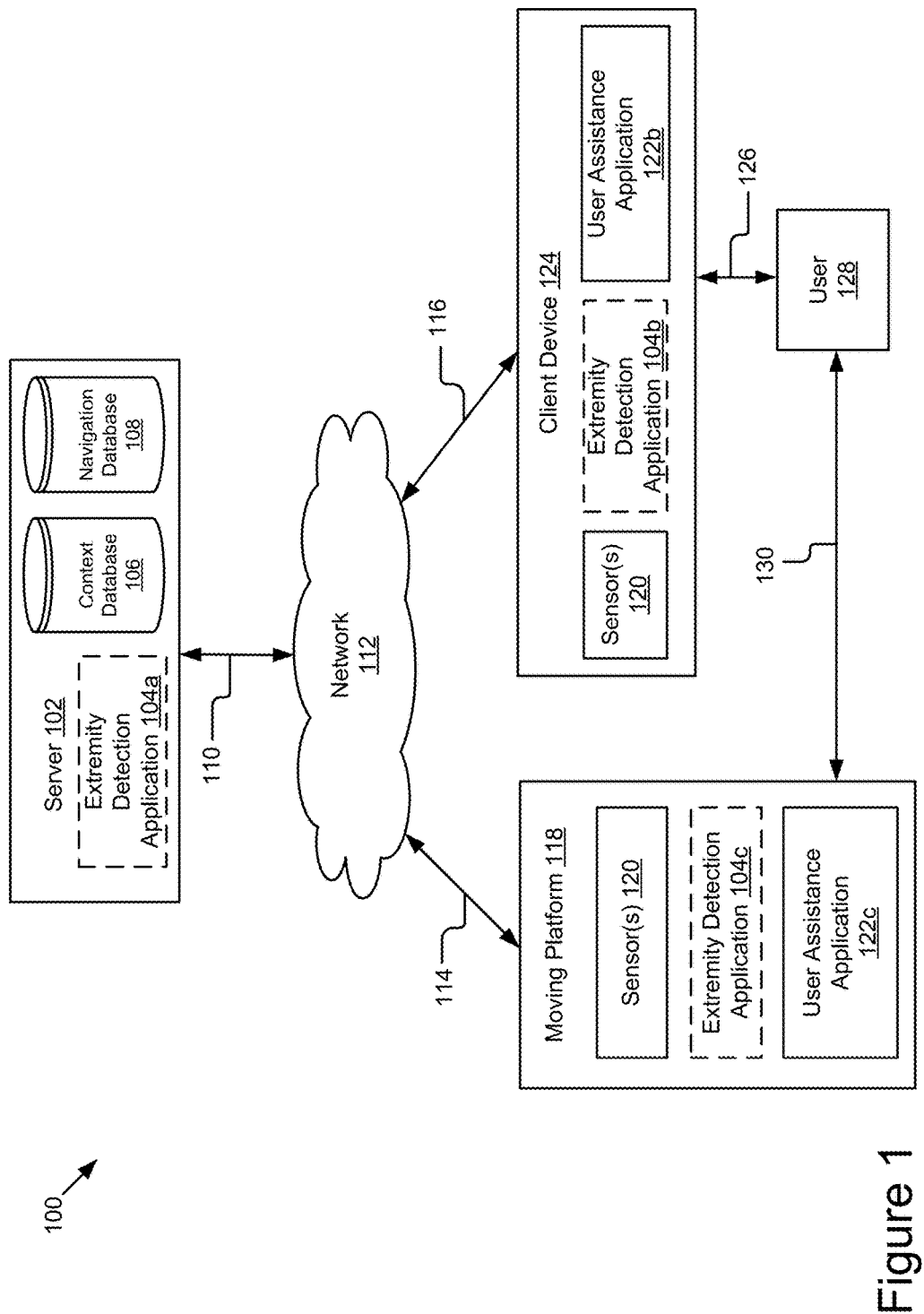
FIG. 1 is a block diagram of an example system for extremity detection.

The technology may include various systems, methods, interfaces, and other aspects. FIG. 1 is a block diagram of one such example system 100 for extremity detection. The illustrated system 100 includes a server 102, a client device 124, and a moving platform 118, although it should be understood that in practice, a plurality of one or more of these elements may be included. The entities of the system 100 are communicatively coupled via a network 112. It should be understood that the system 100 depicted in FIG. 1 is provided by way of example and the system 100 and/or further systems contemplated by this disclosure may include additional and/or fewer components, may combine components and/or divide one or more of the components into additional components, etc. For example, the system 100 may include any number of servers 102, client devices 124, and/or moving platforms 118. Additionally or alternatively, the system 100 may include a speech server for receiving and processing speech commands from a user, a search server for providing search results matching search queries, etc.

The network 112 can be a conventional type, wired or wireless, and may have numerous different configurations including a star configuration, token ring configuration, or other configurations. Furthermore, the network 112 may include one or more local area networks (LAN), wide area networks (WAN) (e.g., the Internet), public networks, private networks, virtual networks, peer-to-peer networks, and/or other interconnected data paths across which multiple devices may communicate. For example, the network 112 may include a vehicle-to-vehicle network, a vehicle-to-infrastructure/infrastructure-to-vehicle network, etc.

The network 112 may also be coupled to and/or include portions of a telecommunications network for sending data in a variety of different communication protocols. In some embodiments, the network 112 includes Bluetooth® communication networks and/or a cellular communications network for sending and receiving data including via short messaging service (SMS), multimedia messaging service (MMS), hypertext transfer protocol (HTTP), direct data connection, WAP, email, etc. In some embodiments, the network 112 is a wireless network using a connection such as DSRC, WAVE, 802.11p, a 3G, 4G, 5G+ network, WiFi™, or any other wireless networks. Although FIG. 1 illustrates a single block for the network 112 that couples to the server 102, the client device 124, and the moving platform 118, it should be understood that the network 112 may in practice comprise any number and/or combination of networks, as noted above.

The server 102 can include a hardware and/or virtual server that includes processor(s), memor(ies), and network communication capabilities (e.g., communication unit(s)). The server 102 may be communicatively coupled to the network 112, as reflected by signal line 110. In some embodiments, the server 102 can send and receive data to and from one or more of the client device 124, and the moving platform 118. The server 102 may include an instance of the extremity detection application 104a, a context database 106, and a navigation database 108, as discussed further elsewhere herein.

The navigation database 108 may store navigation-related data. Examples include mapping data, path data, points of interest, user trip history(ies), etc. In some embodiments, the navigation-related data may include historical navigation data describing driving history of each user and/or route data associated with historical journeys previously taken by the user. Non-limiting examples of historical navigation data include a list of road names associated with road segments the user has travelled in the past, road type of the road segment (e.g., urban, rural, residential, freeway, etc.), road speed information (e.g., speed limit of the road segment, actual speed of the user, etc.), time information (e.g., dates and times of day the user has previously travelled on the road segment, number of times the user has travelled on the road segment, etc.), ease-of-drive metric associated with the road segment (e.g., low, moderate, high, easy, difficult, etc.), etc.

In FIG. 1, the server 102 is shown as including the context database 106 and the navigation database 108, however it should be understood that the moving platform 118 and/or client device 124 may additionally and/or alternatively store the context data and/or historical navigation data. For example, the moving platform 118 and/or client device 124 may include an instance of the context database 106 and/or the navigation database 108, may cache and/or replicate such data from the context database 106 and/or the navigation database 108 (e.g., download the familiarity graphs and/or the historical navigation data at various intervals), may receive data pushed by the server 102 at various increments, etc. For example, the context data and/or the historical navigation data may be pre-stored/installed in the moving platform 118, stored and/or refreshed upon setup or first use, replicated at various intervals, etc. In further embodiments, data from the context database 106 and/or the navigation database 108 may be requested/downloaded at runtime. Other suitable variations are also possible and contemplated.

The client device 124 is a computing device that includes memor(ies), processor(s), and communication unit(s). The client device 124 may couple to the network 112 and can send and receive data to and from one or more of the server 102 and the moving platform 118 (and/or any other components of the system coupled to the network 112). Non-limiting examples of a client device 124 include a laptop computer, a desktop computer, a tablet computer, a mobile telephone, a personal digital assistant (PDA), a mobile email device, a wearable device, an embedded computing device, or any other electronic device capable of processing information and accessing a network 112. In some embodiments, the client device 124 may include one or more sensors 120.

In some embodiments, the client device 124 may include an instance of a user assistance application 122b, which executes instructions configured to provide navigation functionality, search functionality, notifications, other driving-related functionality, moving platform configuration functionality, etc., to the user. The user 128 can interact with the client device 124, as illustrated by line 126. Although FIG. 1 illustrates one client device 124, the system 100 can include one or more client devices 112.

The moving platform 118 includes a computing device having memor(ies), processor(s), and communication unit(s). Examples of such a computing device may include one or more of an electronic control unit (ECU), an embedded computing system, a wireless computing device, or another suitable controller, which is coupled to other components of the moving platform 118, such as one or more sensors, actuators, motivators, etc. The moving platform 118 may be coupled to the network 112 via signal line 114, and may send and receive data to and from one or more of the server 102 and the client device 124. In some embodiments, the moving platform 118 is capable of transport from one point to another. Non-limiting examples of a mobile platform 118 include a vehicle, an automobile, a bus, a boat, a plane, a bionic implant, or any other mobile system with non-transitory computer electronics (e.g., a processor, a memory or any combination of non-transitory computer electronics). The user 128 can interact with the moving platform 118, as reflected by line 130. The user 128 may be a human user operating the moving platform 118. For example, the user 128 may be a driver of a vehicle. The moving platform 118 may include an instance of a user assistance application 122c, which is described in detail elsewhere herein. Although FIG. 1 illustrates one moving platform 118, the system 100 can include one or more moving platforms 118.

The moving platform 118 includes one or more sensors 120. The sensor(s) 120 may include any type of sensors suitable for the moving platform 118 and/or the client device 124. The sensor(s) 120 may be configured to collect any type of data suitable to determine characteristics of a computing device (e.g., the moving platform 118, the client device 124, etc.) and/or its surrounding environment. Non-limiting examples of sensor(s) 120 include various optical sensors (CCD, CMOS, 2D, 3D, light detection and ranging (LIDAR), cameras, etc.), audio sensors, motion detection sensors, barometers, altimeters, thermocouples, moisture sensors, IR sensors, radar sensors, other photo sensors, gyroscopes, accelerometers, speedometers, steering sensors, braking sensors, switches, vehicle indicator sensors, windshield wiper sensors, geo-location sensors, transceivers, sonar sensors, ultrasonic sensors, touch sensors, proximity sensors, etc.

In some embodiments, the sensor(s) 120 may include sensor(s) facing individual(s) in the moving platform 118, such as the driver, to capture signal data reflecting the individual(s). In some embodiments, the sensor(s) 120 may include image sensor(s), such as those discussed elsewhere herein, that are directed toward a driver (user) in the driver's seat and may be configured to capture images. For instance, the sensor(s) 120 may record frames of an image stream (e.g., video stream) using various frame rates suitable for dynamic environments (e.g., 10 FPS, 15 FPS, 30 FPS, 60 FPS+), and may encode and/or process the video and still images captured using any applicable methods. In some embodiments, the facial sensor(s) can collect behavioral data of a user 128 (e.g., the driver) by monitoring the activity of the user's extremities (e.g., hand and/or arm movement, head movement, body movement, etc.) and/or facial expressions (e.g., eyelid motions, saccadic eye movements, etc.). For example, the facial sensor(s) may monitor the user's hand and/or arm positions, as discussed in further detail below. Example frame rate values may be 15 FPS-300 FPS. In a further example, frame rate values may be within 22-36 FPS (e.g., 30 FPS) and RGB sensors, such as web cameras, may be used (e.g., installed in the moving platform 118, such as a vehicle). This is advantageous as existing RGB sensors in the vehicle may be adapted and used (which minimizes costs), or such sensors may be installed at a low cost due to the inexpensive nature of such sensors. Further, processing the image data from such sensors may be processed using existing processors/hardware, eliminating the need for hardware upgrades.

In some embodiments, the sensor(s) 120 may include physiological sensor(s) may include one or more biosensors configured to measure and monitor physiological signals of the user when driving. Examples of physiological signals being captured may include, but are not limited to, electrocardiography signals (e.g., ECG/EKG signal), respiration signal, skin conductance, skin temperature, muscle tension, etc.

In some embodiments, the sensor(s) 120 may include roadway sensors, such as various sensors facing the external environment of the vehicle and configured to capture signal data including aspects of the external environment. For instance, the sensor(s) may include image sensors capturing images of an outside environment; may record frames of an image stream using a suitable frame rate for a dynamic environment, and may encode and/or process the images captured using any applicable methods; etc. For example, in the context of a moving platform, the sensor(s) 120 can capture the environment around the moving platform 118 including other vehicles, pedestrians, roadways, sky, mountains, roadside structure, buildings, trees, dynamic objects and/or static objects (e.g., lanes, traffic signs, road markings, etc.) located along the roadway, etc. In some embodiments, one or more internal or external sensors may be multidirectional (e.g., LIDAR, etc.).

In some embodiments, the technology may fuse together sensor output for processing by one or more context processors, which are described in further detail below. In some cases, the fusion of the sensor data allows the context processors to build a more robust model. For example, data from a physiological sensor may reflect the stress and/or relaxation level of the human driver, the CAN data may reflect interaction by the driver with the controls of the vehicle using one or more extremities, and the detection data may reflect position and dimension of the extremities. A context processor or another upstream component may fuse one or more of these data sets for a given instance of time or time range. The fused data may correlate the position of the extremit(ies) with control(s) of a vehicle, awareness of the driver, and/or other dimensions, and the model processed by the context processor may include dimensions for each of the aspects and/or a combination thereof. Other variations are also possible and contemplated.

Figure 2A:
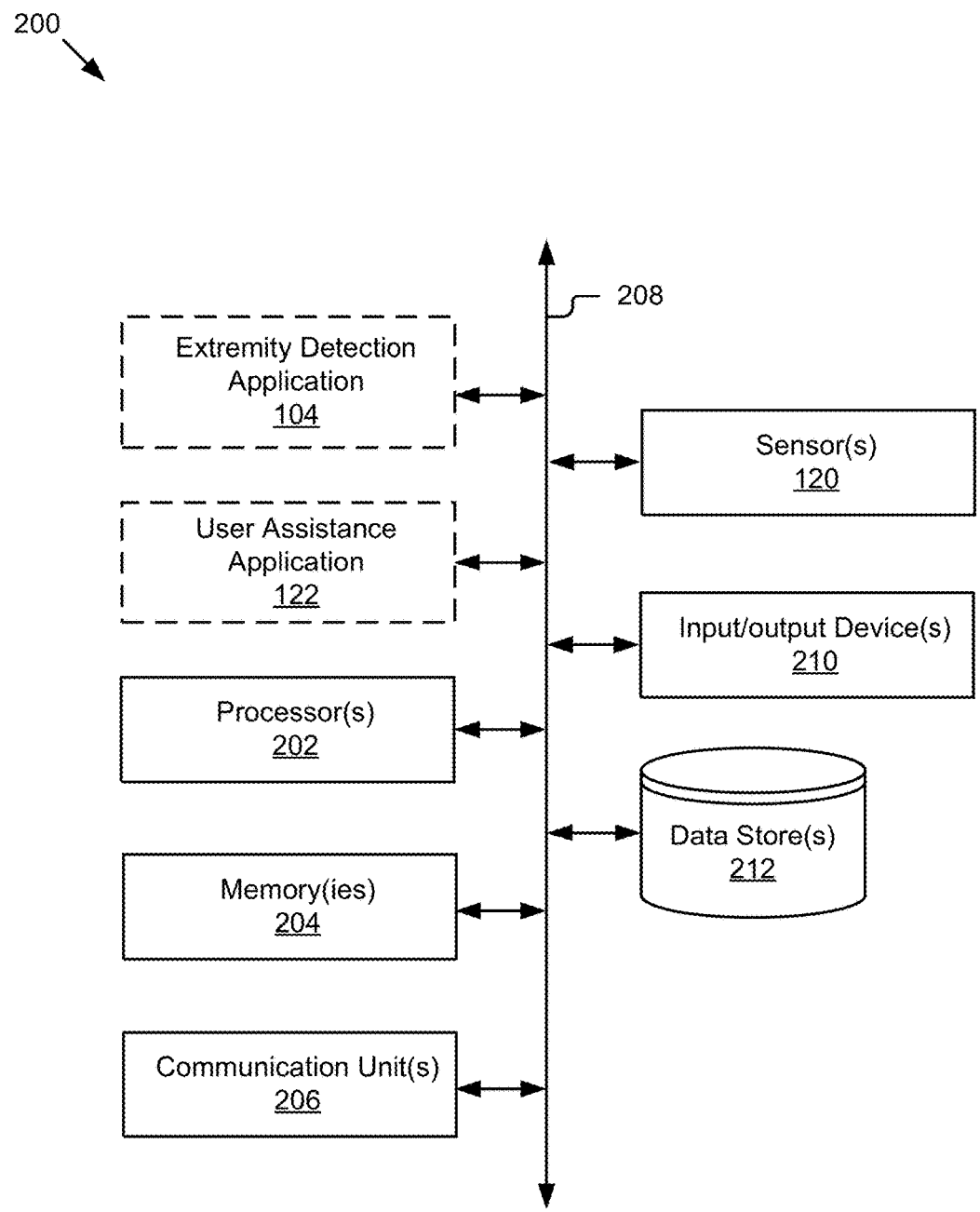
FIG. 2A is a block diagram of an example computing device.

In some embodiments, the sensor data may be stored in one or more data stores, e.g. data store(s) 212 as depicted in FIG. 2A, for later processing and/or analysis.

The processor(s) (e.g., see FIG. 2A) of the moving platform 118 and/or the client device 124 may receive and process the sensor data captured by the sensor(s) 120. In the context of a moving platform 118, the processor(s) may include, be coupled to, or otherwise be associated with an electronic control unit (ECU) implemented in a moving platform 118, such as a car, although other moving platform types are also contemplated. The ECU may receive and store the sensor data as vehicle operation data in a vehicle CAN (Controller Area Network) data store for access and/or retrieval by the extremity detection application 104. In further examples, the vehicle operation data may be more directly provided to the extremity detection application 104 (e.g., via the vehicle bus, via the ECU, etc., upon being received and/or processed). Other suitable variations are also possible and contemplated. As a further example, one or more sensor(s) 120 can sensor data of the internal and/or external environment of the moving platform 118 (e.g., a vehicle) travelling on a road segment. The extremity detection application 104 may receive the sensor data (e.g., image stream, raw or processed signal data, etc.) from the sensor(s) 120 (e.g., via the bus, ECU, etc.) and process it to perform extremity detection-related operations, as discussed further elsewhere herein.

The server 102, the moving platform 118, and/or the client device 124 may include instances 104a, 104b, and 104c of the extremity detection application (also referred to herein as simply 104). In some configurations, the extremity detection application 104 may be distributed over the network 112 on disparate devices in disparate locations, in which case the client device 124, the moving platform 118, and/or the server 102 may each include an instance of the extremity detection application 104 comprising aspects (same, similar, different, etc.) of the extremity detection application 104. For example, each instance of the extremity detection application 104a, 104b, and 104c may comprise one or more of the sub-components depicted in FIG. 2B, and/or different variations of theses sub-components, which are discussed in further detail below. In some configurations, the extremity detection application 104 may be a native application comprising all of the elements depicted in FIG. 2B, for example.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some embodiments may include additional or fewer computing devices, services, and/or networks, and may implement various functionality client or server-side. Further, various entities of the system may be integrated into a single computing device or system or divided into additional computing devices or systems, etc.

The extremity detection application 104 includes software and/or or hardware logic executable to determine scene familiarity of users. As discussed elsewhere herein, in some embodiments, for a given user, the extremity detection application 104 may process sensor data, generate multi-level signature representation describing a road scene, and generate a familiarity index reflecting the familiarity of the user with the road scene. In some embodiments, the extremity detection application 104 can be implemented using software executable by one or more processors of one or more computer devices, using hardware, such as but not limited to a field-programmable gate array (FPGA), an application-specific integrated circuit (ASIC), etc., and/or a combination of hardware and software, etc. The extremity detection application 104 is described below in more detail with reference to at least FIGS. 2B-11.

The moving platform 118 and/or the client device 124 may include instances 122b and 122c of a user assistance application (also referred to herein as simply 122). In some configurations, the user assistance application 122 may be distributed over the network 112 on disparate devices in disparate locations, in which case the moving platform 118 and/or the client device 124 may each include an instance of the user assistance application 122 comprising aspects (same, similar, different, etc.) of the user assistance application 122.

The user assistance application 122 includes software and/or hardware logic executable to provide user assistance to users based on extremity processing performed by the extremity detection application 104. In some embodiments, as discussed elsewhere herein, the user assistance application 122 may provide instructions to a user in real-time and at an appropriate level depending on the output of the extremity detection application 104. As a further example, in some embodiments, an instance of a user assistance application 122, operating at least in part on the moving platform 118 and/or a client device 124 of the user, can provide the user assistance instructions to the user via one or more output devices of the mobile platform 118 and/or a client device 124 (e.g., a speaker system, a graphical user interface displayed on a display, etc.).

In some embodiments, the user assistance application 122 can be implemented using software executable by one or more processors of one or more computer devices, using hardware, such as but not limited to a field-programmable gate array (FPGA), an application-specific integrated circuit (ASIC), etc., and/or a combination of hardware and software, etc.

FIG. 2A is a block diagram of an example computing device 200, which may represent the architecture of any of a server 102, a moving platform 118, or a client device 124.

As depicted, the computing device 200 includes one or more processors 202, one or more memories 204, one or more communication units 206, one or more sensors 120, one or more input and/or output devices 210, and/or one or more data stores 212. The components of the computing device 200 are communicatively coupled by a bus 208. In embodiments where the computing device 200 represents the server 102, it may include an instance of the extremity detection application 104, the context database 106, and the navigation database 108. In embodiments where the computing device 200 represents the moving platform 118 or the client device 124, the computing device 200 may include instances of the user assistance application 122 and the extremity detection application 104. It should be understood that these embodiments are merely examples and that other configurations are also possible and contemplated, as discussed elsewhere herein. Further, the computing device 200 depicted in FIG. 2A is provided by way of example and it should be understood that it may take other forms and include additional or fewer components without departing from the scope of the present disclosure. For example, while not shown, the computing device 200 may include various operating systems, software, hardware components, and other physical configurations.

In embodiments where the computing device 200 is included or incorporated in the moving platform 118, the computing device 200 may include and/or be coupled to various platform components of the moving platform 118, such as a platform bus (e.g., CAN), one or more sensors (e.g., one or more control units (e.g., ECU, ECM, PCM, etc.), automotive sensors, acoustic sensors, chemical sensors, biometric sensors, positional sensors (e.g., GPS, compass, accelerometer, gyroscope, etc.), switches, and controllers, cameras, etc.) an engine, drive train, suspension components, instrumentation, climate control, and/or any other electrical, mechanical, structural, and mechanical components that are necessary.

The processor(s) 202 may execute software instructions by performing various input/output, logical, and/or mathematical operations. The processor(s) 202 may have various computing architectures to process data signals including, for example, a complex instruction set computer (CISC) architecture, a reduced instruction set computer (RISC) architecture, and/or an architecture implementing a combination of instruction sets. The processor(s) 202 may be physical and/or virtual, and may include a single core or plurality of processing units and/or cores. In some embodiments, the processor(s) 202 may be capable of generating and providing electronic display signals to a display device (not shown), supporting the display of images, capturing and transmitting images, performing complex tasks including various types of feature extraction and sampling, etc. In some embodiments, the processor(s) 202 may be coupled to the memory(ies) 204 via the bus 208 to access data and instructions therefrom and store data therein. The bus 208 may couple the processor(s) 202 to the other components of the computing device 200 including, for example, the memory(ies) 204, the communication unit 206, the sensor(s) 120, the input/output device(s) 210, and/or and the data store(s) 212.

The memory(ies) 204 may store and provide data access to the other components of the computing device 200. In some embodiments, the memory(ies) 204 may store instructions and/or data that may be executed by the processor(s) 202. For example, depending on the computing device 200 configuration, the memory(ies) 204 may store one or more of one or more the application(s) 104 and/or 122. The memory(ies) 204 are also capable of storing other instructions and data, including, for example, the various data described herein, an operating system, hardware drivers, other software applications, databases, etc. The memory(ies) 204 may be coupled to the bus 208 for communication with the processor(s) 202 and the other components of computing device 200.

The memory(ies) 204 include a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 202. In some embodiments, the memory(ies) 204 may include one or more of volatile memory and non-volatile memory. For example, the memory(ies) 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 204 may be a single device or may include multiple types of devices and configurations.

The communication unit(s) 206 transmit data to and receive data from other computing devices to which they are communicatively coupled (e.g., via the network 112) using wireless and/or wired connections. The communication unit(s) 206 may include one or more wired interfaces and/or wireless transceivers for sending and receiving data. The communication unit(s) 206 may couple to the network 112 and communicate with other computing nodes, such as client device(s) 124, moving platform(s) 118 and/or server(s) 102, etc. (depending on the configuration). The communication unit(s) 206 may exchange data with other computing nodes using standard communication methods, such as those discussed above.

The data store(s) 212 include a non-transitory storage medium that stores data. Non-limiting example non-transitory storage medium may include a dynamic random access memory (DRAM) device, a static random access memory (SRAM) device, flash memory, a hard disk drive, a floppy disk drive, a disk-based memory device (e.g., CD, DVD, Blu-ray™, etc.), a flash memory device, or some other known, tangible, volatile or non-volatile storage device. Depending on the computing device reflected by FIG. 2A, the data store(s) may represent one or more of the context database 106 and/or the navigation database 108.

The data store(s) 212 may be included in the computing device 200 or in another computing device and/or storage system distinct from but coupled to or accessible by the computing device 200. In some embodiments, the data store(s) 212 may store data in association with a database management system (DBMS) operable by the server 102, the moving platform 118 and/or the client device 124. For example, the DBMS could include a structured query language (SQL) DBMS, a NoSQL DMBS, etc. In some instances, the DBMS may store data in multi-dimensional tables comprised of rows and columns, and manipulate, i.e., insert, query, update and/or delete, rows of data using programmatic operations.

Input/output (I/O) devices 210 include any standard devices for inputting and/or outputting information. Non-limiting example IO devices 210 may include a screen (e.g., LED-based display) for displaying information to the user 128; an audio reproduction device (e.g., speaker) for outputting sound information to the user 128; a microphone for capturing sound and/or voice commands, a keyboard, a touch screen, a pointing device, visual indicators (e.g., lights, backlight displays, etc.), instrumentation, vibrational motors, and/and any other I/O components for facilitating communication and/or interaction with the user 128. Input/output devices 210 can be coupled to the computing device 200 either directly or through intervening I/O controllers.

The extremity detection application 104 is a context-aware framework that includes computer logic executable to capture relevant contextual information of a given environment, such as a moving platform 118, and an operator within the environment (e.g., a driver), and use it to localize moving extremities of the operator. As noted above, in some embodiments, the contextual information may be captured in a hierarchical manner. The extremity detection application 104 may, in performing the extremity detection, leverage rich contextual information of the moving platform 108 to improve hand detection accuracy and robustness. The contextual information, which may be stored and/or retrieved from the context database 106, sensor(s) 120, intervening controllers, etc., may include hand shape data, location data, driving characters, and CAN data of the moving platform 118. It should be understood that, while various example and embodiments included in this document are described with respect to a moving platform 118, the technology may be applied to and suitable for other environments, as discussed further elsewhere herein.

Figure 2B:
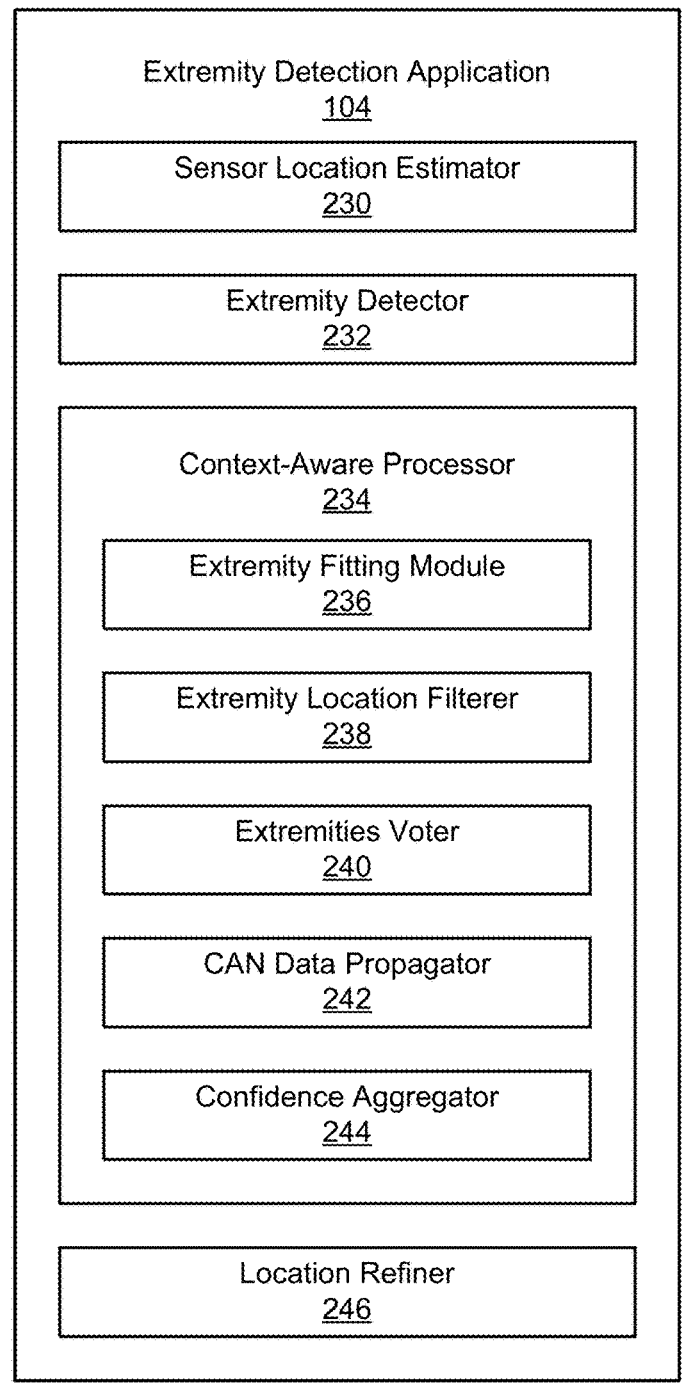
FIG. 2B is a block diagram of an example extremity detection application.

FIG. 2B is a block diagram of an example extremity application 104. As shown, the extremity application 104 may include various constituent components for carrying out various operations, such as algorithms, methods, acts, and/or functions, etc. Example components may include a sensor location estimator 230, extremity detector 232, a context-aware processor 234, and/or a location refiner 246, depending on the implementation. The context-aware processor 234 may include one or more subcomponents, such as an extremity-shape fitter 236, an extremity location filter or 238, an extremities voter 240, a CAN data propagator 242, and/or a confidence aggregator 244. It should, however, be understood that the extremity detection application 104 may include additional components such as, but not limited to, a configuration engine, other training engines, an encryption engine, etc., and/or these various components may be combined into a single component or divided into additional components.

The user assistance application 122 includes computer logic executable to receive a filtered extremity proposal and/or output from the extremity detection application 104 (e.g., via the bus 208 and/or various controllers), and to provide user assistance based thereon (e.g., alerts, tactile, auditory, visual, etc., feedback, driving guidance, etc.) to the user via input/output devices 210. As a further example, the extremity detection application 104 may computationally deduce an activity being engaged in by the driver and the user assistance application 122 may program processor(s) 204 to provide assistance relative to that activity. For instance, the user assistance application 122 may display hand placement feedback to the user based on the current position of the driver's hands. The feedback may be in the form of a lighted indicator, a graphical user interface visualization, or other visual and/or tactile feedback presented by an output device, that notifies the driver that one or more of his/her hands are not on the steering wheel.

In another example, the extremity detection application 104 may deduce that the user is searching for an item on the floor or adjacent seat of the vehicle, and may provide assistance in locating objects in those vicinities (e.g., by providing auditory and/or visual instructions via one or more output devices). The searched-for objects may be detected and their position located using the sensor(s) 120 and the extremity detection application 104 in a same or similar manner to the extremity detection discussed elsewhere herein. Other non-limited examples of activities include texting while driving, consuming food or beverages, etc., and corresponding feedback may include warning indicators, suggested destinations (e.g., pull over at rest stop), autonomous vehicle control, etc.

The user assistance application 122, extremity detection application 104 and/or its components 230, 232, and/or 234, and/or its subcomponents 236, 238, 240, 242, and/or 244, and/or 246, may be implemented as software, hardware, or a combination of the foregoing. In some embodiments, the user assistance application 122, extremity detection application 104 and/or its components 230, 232, and/or 234, and/or its subcomponents 236, 238, 240, 242, and/or 244, and/or 246, may be communicatively coupled by the network 112, the bus 208, and/or the processor(s) 202 to one another and/or the other components of the computing device 200 and/or system 100. In some embodiments, one or more of the components 122, 104 and/or its components 230, 232, and/or 234, and/or its subcomponents 236, 238, 240, 242, and/or 244, and/or 246, are sets of instructions executable by the processor(s) 202 to provide their functionality. In further embodiments, one or more of the components 122, 104 and/or its components 230, 232, and/or 234, and/or its subcomponents 236, 238, 240, 242, and/or 244, and/or 246, are storable in the memor(ies) 204 and are accessible and executable by the processor(s) 202 to provide their functionality. In any of the foregoing embodiments, these components 122, 104 and/or its components 230, 232, and/or 234, and/or its subcomponents 236, 238, 240, 242, and/or 244, and/or 246, may be adapted for cooperation and communication with the processor(s) 202 and other components of the computing device 200.

In some software embodiments, one or more of the user assistance application 122 and the extremity detection application 104 and/or its components 230, 232, and/or 234, and/or its subcomponents 236, 238, 240, 242, and/or 244, and/or 246, may comprise one or more software methods that may be called by other components of the system. For example, one or more of these components may be instantiated by another one of the components, may have one or more functions called by another one of the components, may receive one or more operational parameters to those instances, may process and provide output as discussed herein, etc. It should be understood, however, that other variations are also possible and contemplated.

Each of the user assistance application 122 and the extremity detection application 104 and/or its components 230, 232, and/or 234, and/or its subcomponents 236, 238, 240, 242, and/or 244, and/or 246, may be coupled to one another to exchange data, and may be coupled to the context database 106, and/or other information sources, such as the navigation database 108, the memor(ies) 204, etc., other computing systems, etc., to store and/or retrieve data. The user assistance application 122 and the extremity detection application 104 and/or its components 230, 232, and/or 234, and/or its subcomponents 236, 238, 240, 242, and/or 244, and/or 246, are described in further detail below.

Sensor location means a position and/or viewpoint with respect to an orientation and/or sides of a platform, such as a moving platform 118. The sensor location may correspond to a single sensor 120 or a set of sensors 120 that work collaboratively to capture sensor data. The sensor location of a given sensor 120 or set of sensors 120 may be estimated using sensor (e.g., image) data, may be predefined, etc.

Figure 3A:
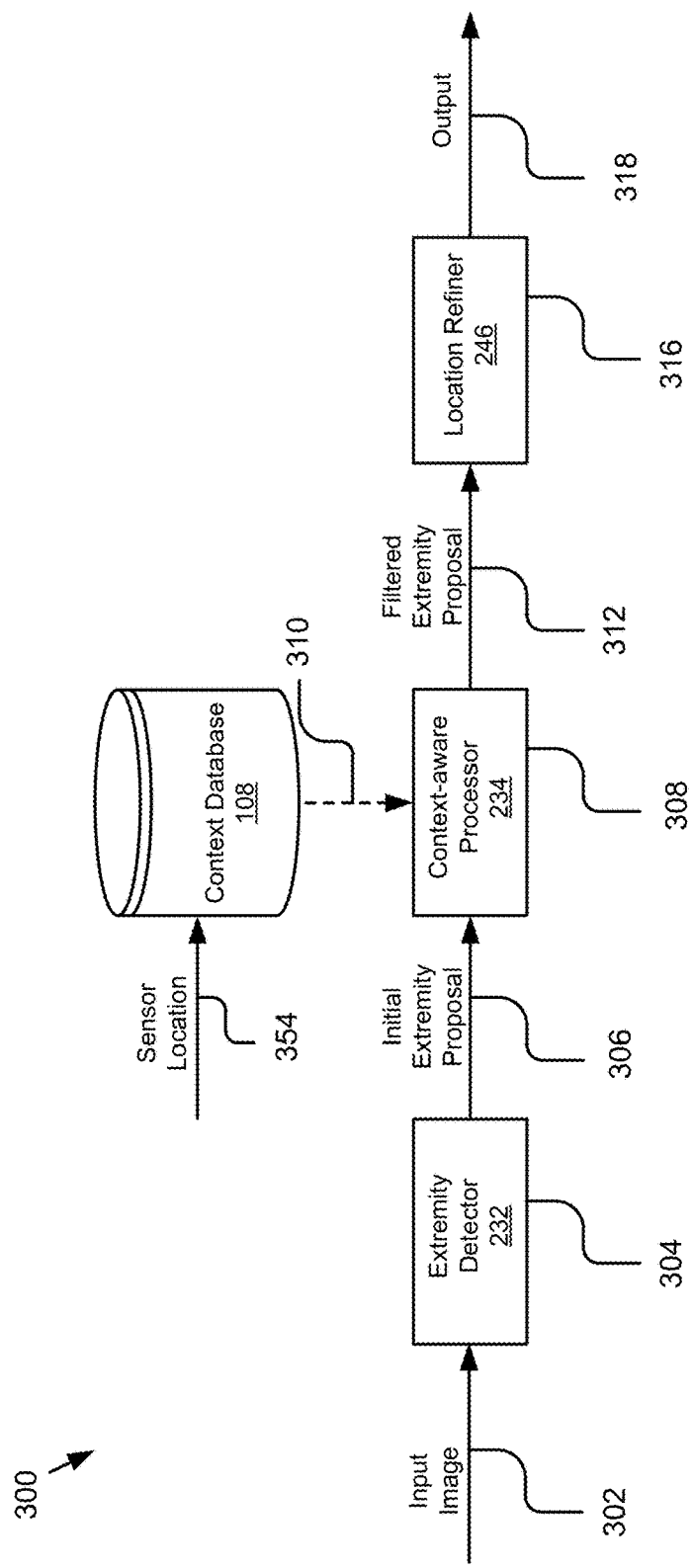
FIG. 3A is a flowchart of an example method for detecting and refining extremities.

FIG. 3A is a flowchart of an example method 300 for detecting and refining proposed extremities. In block 304, the extremity detector 232 receives an input image 302 from one or more sensors 120. The extremity detector 232 processes the input image 302 for objects (also called object detection). The extremity detector 232 may use object detection algorithms for determining objects from the input image data. In some embodiments, the algorithms may filter out objects that are inconsistent with the general size or shape of the extremities of interest, such as hands. Since the size and shape of most people's hands fall within a certain range, the algorithms may be adapted to detect objects that fall within those ranges.

By way of further example, the initial hand proposals may be generated using a standard general-purpose hand detector. For instance, an Aggregate Channel Features (ACF) object detector may be used. The ACF detector may utilize A (e.g., 10) input channels, including B (e.g., 1) normalized gradient magnitude channel, C (e.g., 6) gradient orientation channels and D (e.g., 3) LUV color channels. Features may be generated by aggregating and smoothing the input channels, and a decision-tree (e.g., AdaBoost) classifier may be trained for classification. Object detection may be performed using various approaches, such as a sliding-window approach.

The output of the detection algorithms may be provided to the context-aware processor 234 as the initial extremity proposal 306. The initial extremity proposal 306 includes one or more data sets describing one or more proposed extremities detected from the input image 302. By way of example and not limitation, the output of the ACF detector may be a set of axis-aligned bounding boxes (denoted as $bb_{ACF}$) along with a score ($S_{ACF}$) proportional to the detection confidence. In block 308, the context-aware processor 234 may use the initial extremity proposal 306 and context data 310 to filter the initial objects included in the initial extremity proposal. In some embodiments, the context data 310 may be retrieved from the context database 108.

In some embodiments, the context data is determined based on a sensor location. The sensor location may be provided as an input 354 by the context-aware processor 234 or another component responsive to the contextual data associated with the input image 302 being requested. For example, the sensor location may describe the location of the sensor(s) 120 providing the input image 302. In some instances, the context-aware processor 234 may generate a context model from context data received from the context database 108, and use the context model to filter the objects included in the initial extremity proposal.

In block 314, the location refiner 246 may receive the filtered extremity proposal 312 including filtered proposed extremities processed by the context-aware processor 234 in block 308. The location refiner 246 may refine the locations of the proposed extremities, and then generate and provide an output 316. In some embodiments, refining the locations of the proposed extremities includes correcting placement error of those extremities.

Figure 3B:
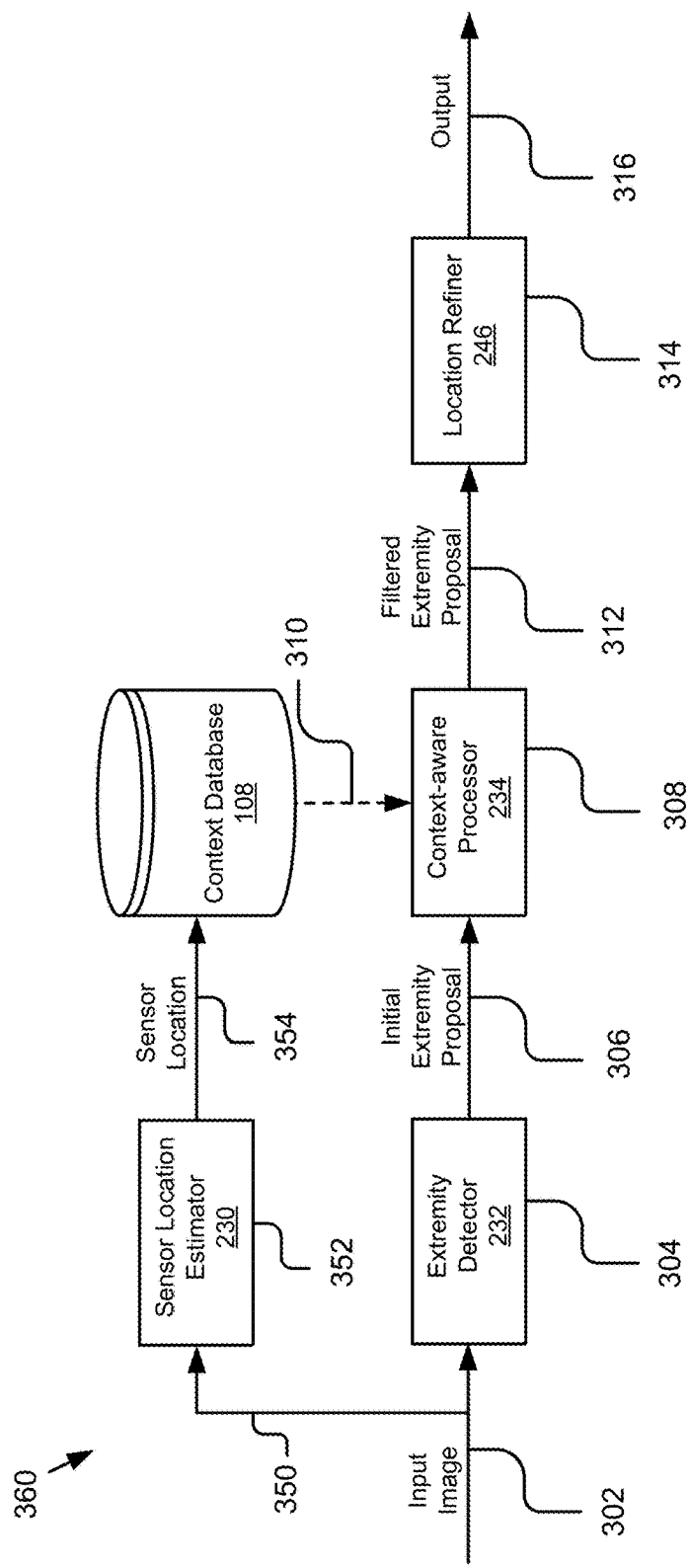
FIG. 3B is a flowchart of a further example method for detecting and refining extremities.

FIG. 3B is a flowchart of a further example method 360 for detecting and refining extremities. The operations associated with reference numbers 302, 304, 306, 308, 310, 312, 314, and 316 are substantially similar and/or the same as that described above with reference to FIG. 3A, and the description of those elements will not be repeated here for the purpose of brevity.

As can be seen from FIG. 3B, the method 360 is capable of automatically estimating sensor location using the input image 302. The process for estimating the sensor location may operate as follows. In block 352, the sensor location estimator 230 may receive 350 the input image 302. The sensor location estimator 230 may extract features from the input image and processes features to determine an estimated sensor location for the sensor(s) 120 that captured the input image 302.

In some embodiments, the sensor location estimator 230 may extract global color and texture features. The color features may encode information about the brightness and prevalent color components of the image. In some embodiments, the color features may comprise color histograms in a plurality of different color spaces (e.g., LAB and LUV).

The texture features may encode the appearance of present objects and the overall scenes by edge and corner detectors. In some embodiments, the texture features may comprise a histogram of oriented gradient (HOG).

The sensor location estimator 230 may extract the color and texture features from an input image using a grid. The grid may be dynamically determined or may be predetermined. An example grid may be an 8×8 grid. Extracting the features using the grid is advantageous as detailed information, such as color and texture features, can be associated with specific, corresponding grid-cell locations. This grid-cell association can be used to refine and/or localize the features during extremity detection and positioning.

The sensor location estimator 230 may feed the encoded global and detailed local information, such as the color and texture features, into a discriminative model. The discriminative model may discriminate, based on the input, the viewpoint(s) of the sensor(s) 120 associated with the input. The discriminative model may be trained for sensor location estimation using a set of training data in which the locations of the sensors capturing the images in the training data are known. In some embodiments, the sensor location estimator 230 may train the discriminative model to learn estimates for new positions and/or refine estimates for already programmed positions using the image data it processes during an iteration of the method 360.

Using the discriminative model, the sensor location estimator 230 is configured to output the probability of sensor locations of the input image. The following are example probabilities of sensor locations (e.g. Backview—0.62, Frontview—0.13, Sideview—0.02, etc.). This output may be provided 354 to the context database for retrieving context data, as described elsewhere herein.

By way of further example and not limitation, the viewpoint of a sensor or set of sensor(s) 120 that capture the image(s) affects the models used by the context processors. For instance, as the viewpoint changes, the context model may also change correspondingly. In some embodiments, given an input image I and a set of pre-defined viewpoints V, the sensor location estimator 230 may determine the most-likely viewpoint v* using following the equation 1:

$$v^* = \mathrm{argmax}_{v \in V} P(v|G(I)) \qquad (1)$$

where G(I) denotes a set of global color and texture features of the input I. The color features encode information of brightness and prevalent color components, represented by color histograms in grayscale and LUV color spaces. In this example, the color histogram is calculated on an 8×8 grid on the entire image, with 64 bins for each histogram, although other grid and bin sizes are also applicable and contemplated. The texture features encode information of the appearance of present objects and the overall scene, represented by histogram of oriented gradient (HOG). The HOG features were extracted on an 8×8 grid size, with 9 orientations and no overlapping cells. The color and texture features were concatenated together and then fed into a SVM model to estimate probability $P(v|G(I))$.

After determining the optimal viewpoint v*, the corresponding context detectors may be recalled. It is noted that, in some in-vehicle applications, the viewpoint information may be given or known, which eliminates the need of viewpoint estimation.

Figure 4:
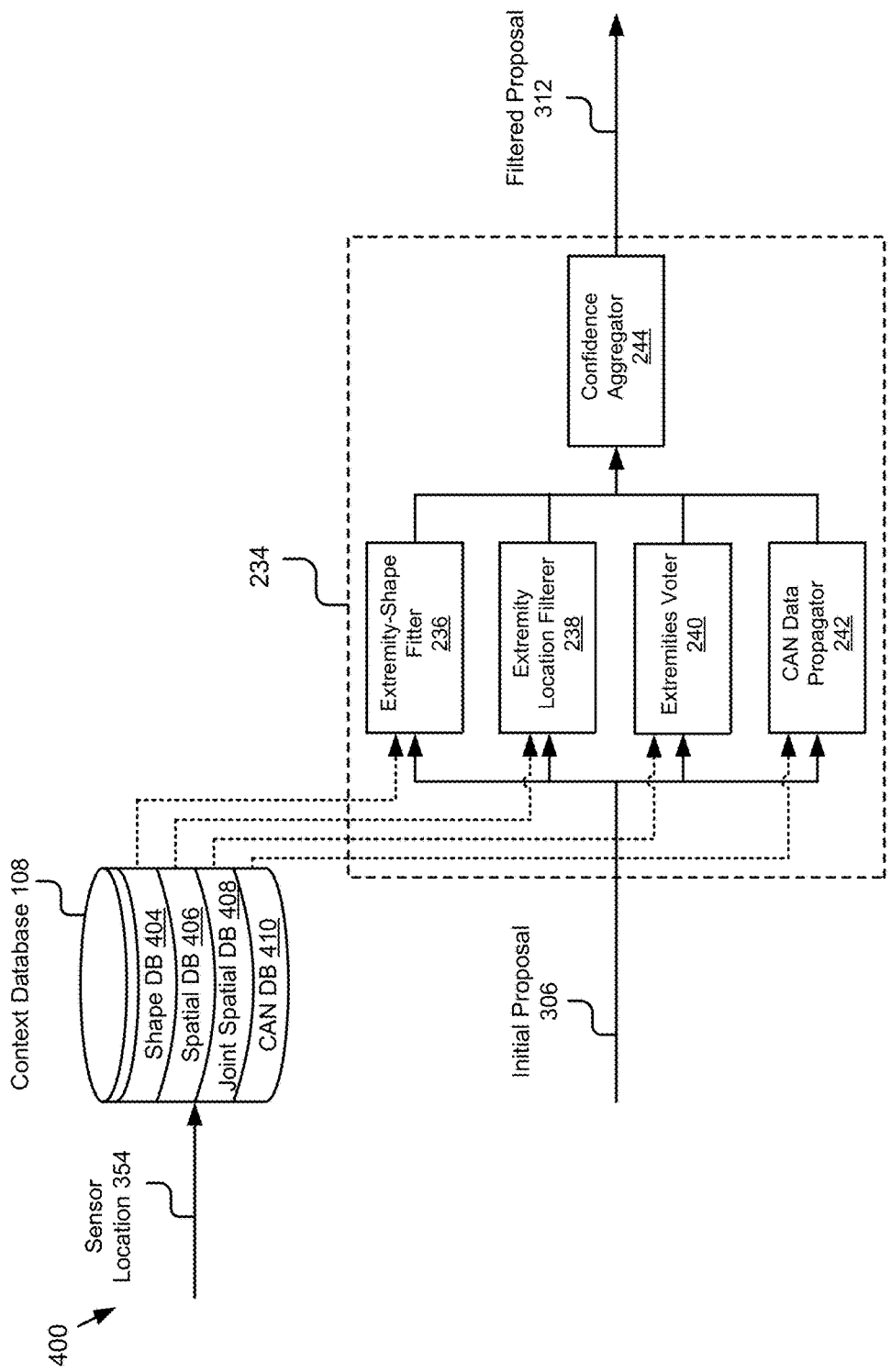
FIG. 4 is a flowchart of an example method for context-aware extremity processing.

FIG. 4 is a flowchart of an example method 400 for context-aware extremity processing. As shown, the context-aware processor 234 may, based on the sensor location 354, retrieve context data. More particularly, the context-aware processor 234 includes two or more (in this example, four) context processors, which are the extremity-shape fitter 236, the extremity location filterer 238, the extremities voter 240, and the CAN data propagator 242. Each of the context processors may receive and process the initial proposal 306, and may receive various context data from the context database 108.

The extremity-shape fitter 236 is executable to perform extremity-shape fitting. More particularly, the extremity-shape fitter 236 can model statistically likely bounding boxes. A boundary box bounds a given detected object included in the initial proposal 306.

The extremity-shape fitter 236's model may be configured to learn statistically common shapes for extremity bounding boxes, such as bounding boxes that bound the most common human hand shapes and sizes (collectively called dimensions), such as those within 1, 1.5, 2, etc., standard deviations from an average (e.g., mean) value. The extremity-shape fitter 236 may rank the bounding boxes for the possible extremities included in the initial proposal 306 using the model. For instance, the bounding boxes may ranked based on a level of deviation from average dimensions, e.g., bounding boxes of uncommon dimensions may be ranked lower relative to more common dimensions (which would rank higher). As a further example, other solutions could false-positively identify a large lap area that has a similar color as a hand, while the extremity-shape fitter 236 would filter-out the lap area because its bounding box, which has an uncommon size, has been ranked lower using the trained model. In another example, thin and long shapes are typically uncommon for hand shapes, and the bounding boxes for those shapes would similarly be lower-ranked. The extremity-shape fitter 236 may output corresponding confidence values for bounding boxes to the confidence aggregator 244.

In some embodiments, the model used by the extremity-shape fitter 236 may estimate the distribution of the bounding boxes from ground-truth hand proposals, and then calculate a fitting score for each proposal. The uncommon bounding box shapes score lower while the common bounding box shapes score higher, as discussed in further detail with reference to at least FIG. 5.

In some embodiments, a Gaussian Mixture Model (GMM) may be used to model the distribution of each bounding box. A GMM model may be built for each viewpoint using corresponding data from that viewpoint. A GMM model may be characterized by parameter $\theta := \{\theta_1, \theta_2, \ldots, \theta_K\}$ where $\theta_i := \{\omega_i, \mu_i, \Sigma_i\}$, with $\omega_i$ as the priori probability, $\mu_i$ as the mean, and $\Sigma_i$ as the covariance of one of the K Gaussian components. Under the trained GMM model $\theta$, the fitting score of an input x may be $p(x|\theta) = \Sigma_{i=1}^{K} \omega_i \mathcal{N}(x|\mu_i, \Sigma_i)$, which characterizes the likelihood that x was generated by the GMM model.

Training of the GMM model may be achieved using an EM algorithm. Two hyper-parameters may be used to tune the GMM model, such as the mixture number K (to control over-fitting) and the covariance type $\Sigma$ (to control computational cost). Both hyper-parameters may be selected automatically by use of a Bayesian Information Criterion (BIC). The average fitting score during training with the optimal GMM model may be recorded as a normalization factor $\gamma$. The trained model may be parameterized using the following equation 2:

$$bbs_x(x; d, K^*, cov^*, \gamma) \qquad (2)$$

where x stands for the input feature, d for the input dimensionality, K* for the optimal mixture number, cov* for the optimal covariance type (spherical, diagonal, tied, full, etc.) and $\gamma$ for the normalization factor. A GMM model may be trained for each bounding box individually and/or may be trained jointly for two or more of the bounding boxes.

In usage, the relevant bounding box dimension (e.g., shape) information may be extracted and fed into the trained GMM model. The normalized fitting score (divided by $\gamma$) may be used to assess the confidence of the proposed bounding box, from the perspective of each shape property. The average of the normalized fitting scores, denoted as $S_{bbs}$, may be the output by the extremity-shape fitter 236.

Figure 5:
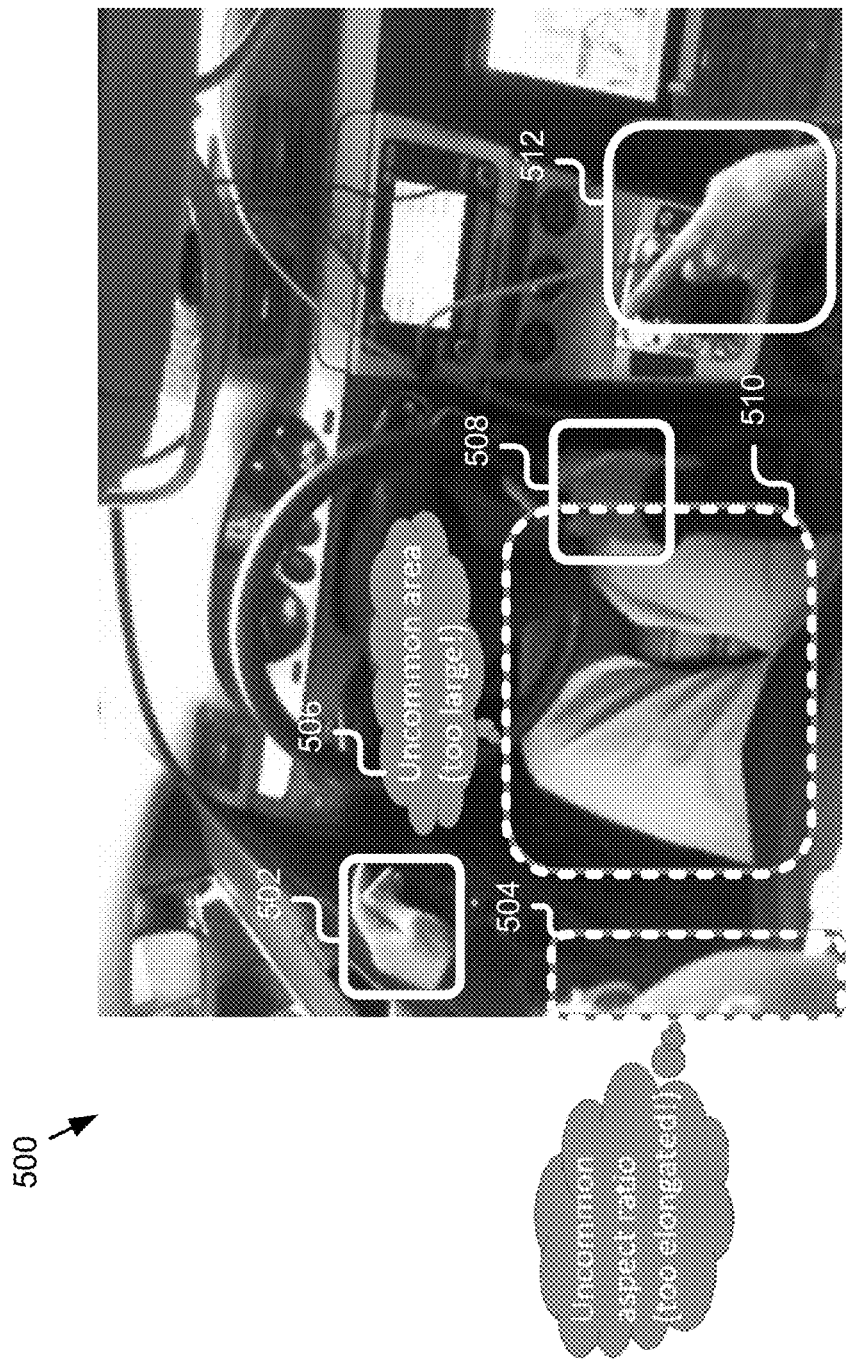
FIG. 5 is an example image of a vehicle cabin annotated with bounding boxes.

By way of further illustration, FIG. 5 depicts an example image 500 of a vehicle cabin annotated with bounding boxes bounding potential extremity objects detected from the image. This figure illustrates how the shape-fitting model of the extremity-shape fitter 236 can filter out the uncommon hand proposals.

Bounding box 502 and bounding box 508 correspond with the driver's hands detected from the image. Bounding box 512 corresponds with the passenger's hand detected from the image. The other bounding boxes 504 and 510 have shapes that are inconsistent with most people's hand dimensions. As a result, these bounding boxes have been flagged by the extremity-shape fitter 236 as likely not bounding hands based on their ranking. More particularly, bounding box 506 is determined to be too large, and bounding box 504 is determined to have an unordinary aspect ratio. In this example, the extremity-shape fitter 236 may output corresponding low confidences for the dashed bounding boxes 506 and 504, and may output enhanced, higher confidences for the solid-line bounding boxes 502, 508, and 512.

Returning to FIG. 4, the extremity-shape fitter 236 may retrieve shape data from the shape database 404. The shape data may include data sets describing different extremities and dimensions for those types. The shape data may include an initial set of training data characterizing known or common extremity (e.g., hand) dimensions. Further, the shape data may including machine learned data sets describing extremity dimensions and/or types that are learned over time during operation.

In some embodiments, the bounding boxes are associated with the perspective from which they are derived, since the capture perspective of a sensor 120 can distort images in different ways and/or the same or similar objects may appear differently in images taken from different perspectives. As such, bounding box dimensions for different sensor locations may be stored for an extremity having a given size and shape.

The extremity location filterer 238 filters objects in the initial proposal 306 based on extremity location. The spatial database 406 stores spatial data capturing the likelihood of extremity presence relative to location within the image frame. The extremity location filterer 238 includes a spatial model that utilizes the spatial data to determine likelihoods for the extremity proposals in the initial proposal 306. In some embodiments, the model may characterize a driver's extremity (e.g., hand) based on an extremity placement preference for that driver or a plurality of drivers.

Figure 6:
FIG. 6 depicts an example image overlaid with spatial filtering data.

In some embodiments, the extremity location filterer 238 may build a spatial model modeling the likelihood of extremity presence over the entire image. FIG. 6 shows a sample spatial distribution as the output of the model, and is discussed in further detail elsewhere herein.

Using such a model, the hand proposals from comparatively rarer locations, which in some instances are usually false positives, may be filtered out. In some embodiments, a spatial model may be trained for each viewpoint, since the spatial distribution for different viewpoints may differ significantly.

To build the spatial distribution model, the extremity location filterer 238 may, for each ground truth hand, cast a vote to its surrounding regions. The vote may be jointly determined by extremity location, extremity size, and a spread factor $\gamma_w$. The spatial model generation process may be embodied by Algorithm 1 shown in FIG. 11. In an example use case, given a hand proposal in the image, its location may be normalized as shown on line 8 of Algorithm 1. Then the spatial model $\overline{M}_s$ may be queried at the normalized hand location $(x_n, y_n)$, and the resultant score may be denoted as $S_{spatial}$. The hyperparameter in this algorithm is the window spread factor $\gamma_w$. The smaller the value is, the broader effect each ground truth hand may impose to the spatial model. The optimal value of $\gamma_w$ may be selected through a grid search process ($\gamma_w$=2, 4, 8, 16).

FIG. 6 depicts an example image 600 overlaid with spatial data generated by the extremity location filterer 238 model and/or retrieved from the spatial database 406. The overlaid data forms a heat map (in JET color space) that visually indicates hand presence likelihood. In this example, the driver prefers to place his hands on three separate locations on the steering wheel, as reflected by reference numbers 602, 604, and 606. Further, within a given location, the extremity location filterer 238 may determine a probability gradient. For example, for each of the locations 602, 604, and 606, the red regions indicate a high probability of hand presence, yellow regions indicate moderately high probability of hand presence, bright blue indicates a moderate probability of hand presence, and the darker blue regions indicate a lower probability. In this example, the driver has two preferred locations on the steering wheel to place hands, 602 and 604, and he also sometimes prefers to put right hand on the lap area 606.

Returning to FIG. 4, using such a model, the extremity location filterer 238 can filter out extremity proposals which are in lower probability (uncommon) locations, such as in the upper right corner of the image (e.g., which are often false positives). These probabilities may be output as confidence values for the confidence aggregator 244.

The extremities voter 240 may evaluate the presence of a plurality of extremities within the image data 306. In some embodiments, the extremities voter 240 may use a joint-spatial distribution model to determine confidences for different combinations of extremities. The confidences for different extremity combinations may increase or decrease based on frequency of appearance in image data. The model may learn over time/several iterations the frequency of different combinations, and the confidences may evolve over time. Data reflecting the different combinations, frequency, etc., may be stored as joint spatial data in the joint spatial database 408.

As an example, some drivers prefer to put both of their hands on the steering wheel (e.g., at positions corresponding to 10 o'clock and 2 o'clock), resulting in a relatively constant relationship (e.g., distance) between the two hands. The extremities voter 240 may detect, based on the relationship between the extremities of the combination and a dimension (e.g., a diameter) of the steering wheel in the image, that the extremity relationship and steering wheel dimension are the same or substantially similar (e.g., within 80%), and may attribute a relatively higher confidence value for the combination or the proposed extremities associated with the combination (with respect to a max and min value, the values of other proposed extremities/extremity combinations in the image, etc.).

In some embodiments, the extremities voter 240 may model a pairwise relationship (distance, angle, normalized x-displacement, normalized y-displacement, etc.) between a pair of ground-truth extremities. The extremities voter 24 may use each proposed extremity to cast a vote for other extremities following the built pairwise relationship. This method is sometimes referred to herein as mutual voting. The extremities having higher voting scores may be ranked higher, and vice versa. Confidence values reflecting the rankings are output to the confidence aggregator 244, as discussed in further detail elsewhere herein.

In some embodiments, the extremities voter 240 may build a joint-spatial distribution model to increase the confidences of the extremities (e.g., hands), which together, form a more statistically likely configuration. For example, as discussed further elsewhere herein, some drivers prefer to put both hands on the steering wheel, resulting in a relatively constant distance between two hands. If two hands are detected to have a distance similar to the diameter of the steering wheel, their confidences are increased by the extremities voter 240.

Figure 12:
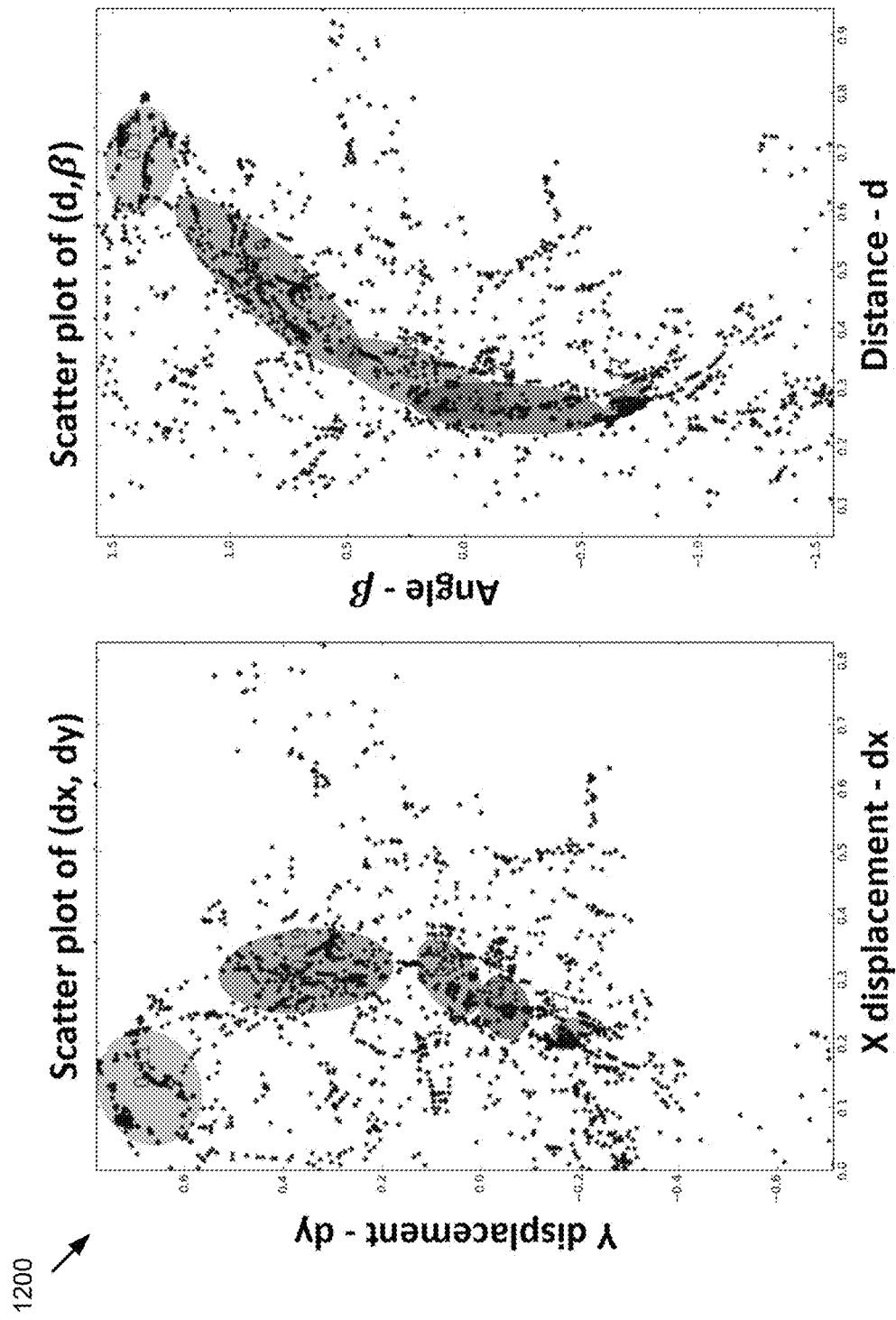
FIG. 12 is a graphical representation of example results from a fitted model.

In some embodiments related to training, the pairwise relationship between ground-truth extremity pairs may be modeled. For instance, given two ground truth hands located at ($x_1$, $y_1$) and ($x_2$, $y_2$) from the same image whose size is ($w_i$, $h_i$), the two hands are swapped (if necessary in some cases) to verify that after swapping, hand2 is to the right of hand1 ($x_2$>$x_1$). In this case, a first direction is modeled to prevent repeated calculation from reciprocal symmetry. After the swapping, the pair-wise relationship between the two hands may be characterized using a set of 4 values (dx, dy, d, $\beta$) where $$dx:=(x_2-x_1)/w_i \; dy:=(y_2-y_1)/h_i$$

$$d:=_2\sqrt{dx^2+dy^2} \; \beta:=\arctan(dy/dx) \quad (3)$$

describe distance, angle, normalized xdisplacement, and normalized y-displacement. For each image from the training dataset, the pair-wise features among extremity pairs (if more than 1 extremity is present) may be extracted. For the image consisting of \$n\$ hands, n(n−1)/2 pair-wise features may be generated. Such features from the training images may be extracted and then modeled using a GMM model. The optimal hyper-parameters for GMM may be selected automatically using BIC. The average GMM fitting scores $\beta$ may be recorded for normalization purposes. Sample results 1200 of the fitted GMM model are shown in FIG. 12, together with scatter plot of extracted relationship features. As shown in this example, the fitted GMM model captures statistically common layouts of hands, where two hands are mostly placed in a horizontal line with a distance similar to the steering wheel diameter.

In a further example, the reciprocal relationship between each pair of hands may be captured in the same way as in the training, and then fitted using the trained GMM model. For each proposed hand x, the fitting scores from the other hands y may be summarized using the following equation 4:

$$p(x) = \sum_{y \in Y, y \neq x} p(x,y) = \sum_{y \in Y, y \neq x} p(x|y)p(y) = \frac{1}{|Y|}\sum_{y \in Y, y \neq x} p(x|y) \quad (4)$$

where Y indicates the hand proposals in the current frame. An equal prior may be assumed for all hand proposals and the GMM fitting score may be used to approximate p(x|y). The likelihood score p(x) may be normalized using $\beta$ and the resultant score may be denoted as $S_{joint}$.

Figure 7:
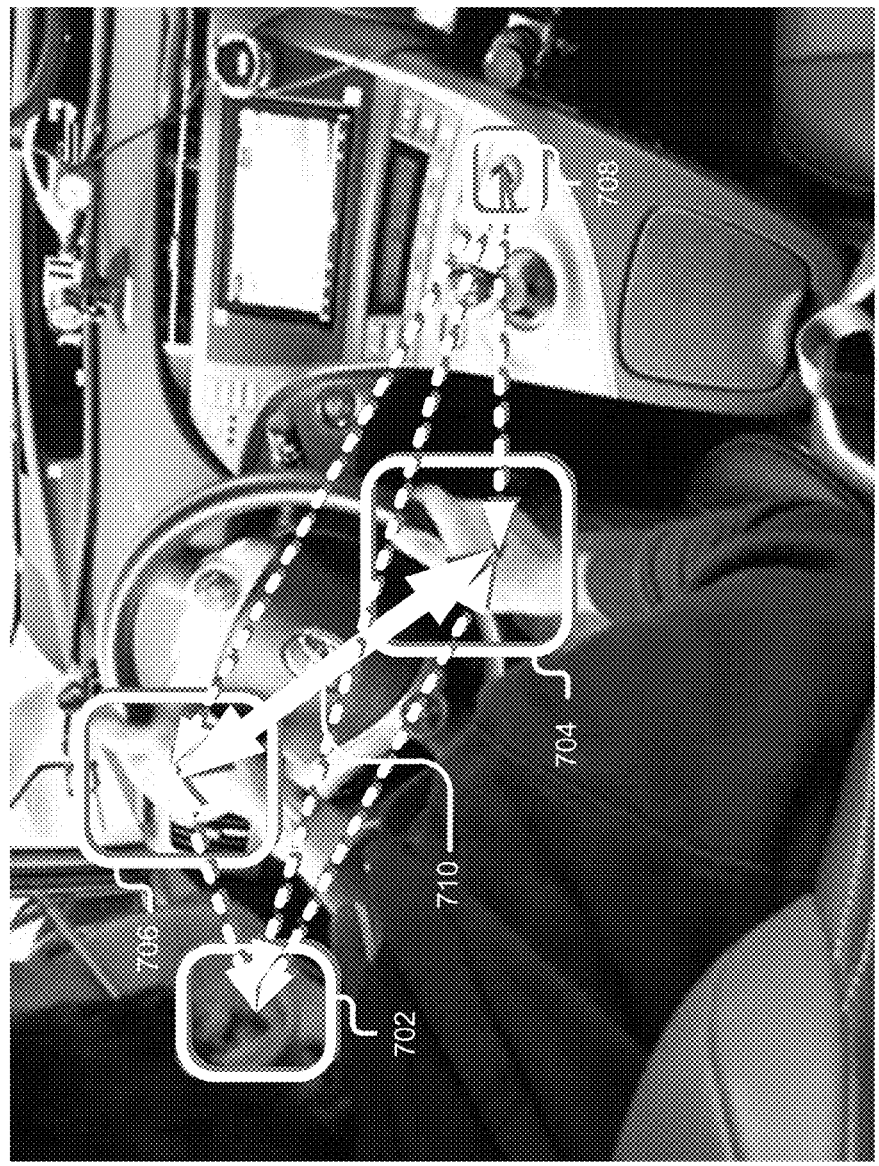
FIG. 7 depicts an example annotated image illustrating joint spatial distribution.

FIG. 7 depicts an example annotated image 700 illustrating joint spatial distribution. Bounding boxes 702, 704, 706, and 708 bound objects within the image reflect proposed hand positions. The arrows between these bounding boxes 702, 704, 706, and 708 indicate the mutual voting method between the hand proposals. More particularly, the dashed arrows indicate a less-likely pair-wise relationship, while the thicker, solid arrow 710, which corresponds to the regular distance between the user's hands and the diameter of the steering wheel, indicates a more-likely pair-wise relationship. As such, the extremities voter 240 attributes lower confidence values for the less-likely pair-wise relationship and higher confidence values for the more-likely pair-wise relationship.

In some embodiments, the location refiner 246 is capable of fine-tuning the location and/or dimensions of the final bounding box based on context data and/or the models discussed herein. Ground-truth (G) and proposal (P) pairs, as well as local color and texture features within the proposed bounding box (P) may be used. Based on the local appearance of the proposed bounding box (P), as well as the corresponding ground truth data (G), the location refiner 246 can model how the proposed bounding box (P) should be corrected after identifying certain cues in the local appearance.

For example, through a training process, the model of the location refiner 246 may learn that if there is a portion of an extremity present in the lower right corner of the proposed bounding box (P), the bounding box (P) should be shifted towards the lower right direction so that the bounding box (P') can better fit the extremity, thus increasing the detection accuracy. This approach can also address the problem of detecting partially occluded hands, since it does not require the presence of the entire hand for detection.

In some embodiments, the location refiner 246 may correct placement errors of hand proposals using a bounding box regression (BBR) model. The regression model may adjust extremity proposal locations after observing certain cues. For example, if a portion of hand is observed in the lower right corner of the bounding box, it may be shifted towards the lower right direction to better fit the entire hand. Given a hand ground truth $G_i$; an associated hand proposal $P_i$ and its local features $\phi P_i$, and a ridge regression model $\omega^*$ may be trained to shift proposals following $\omega^*\phi P(i)$, so that the error between projection and the ground truth may be minimized, as provided for in the following equation 5:

$$w^*=\text{argmin}_w \Sigma_i \|G_i - \omega^T \phi(P_i)\|^2 + \lambda \|w\|^2 \qquad (5)$$

The local features $\phi P(i)$ include color and texture features may be extracted in the same manner as that described above on a local patch P(i). The regularization parameter $\lambda$ and the association threshold (an Intersection-Over-Union overlap between P(i) and G(i)) may be optimized through a grid search on a validation set ($\lambda$=1, 10, 100, 1000 and IoU=0.1, 0.3, 0.5).

FIG. 9 depicts an example image 900 annotated to show adaptation of two bounding boxes using the BBR performed by the location refined 246. The white rectangles are the initial bounding boxes before running BBR, and the black rectangles are the refined bounding boxes after running BBR. As shown, the refined bounding boxes better fit the driver's hands.

Returning to FIG. 4, the CAN data propagator 242 may use the CAN bus data to enhance accuracy of the proposed extremities. The CAN data may be received at a time corresponding to the image data (e.g., contemporaneously with the CAN data, within a fraction of a second, 1-2 seconds, etc.). In some embodiments, the CAN data propagator may analyze CAN data retrieved from the can database 410 of the context database 108 and/or received directed from a CAN bus. For example, after receiving a trigger signal reflecting a interaction with a vehicle control (e.g., manual gear shift, a panel button press, a turn signal switch, a wheel movement, etc.), the CAN data propagator 242 assumes a hand or other extremity was used by the user to operate the control. The CAN data propagator 242 may use the information to propagate a probabilistic distribution about the location of the hand. A confidence value based on the distribution may be attributed to the hand and output to the confidence aggregator 244. In some embodiments, each control may have a specific working range and associated following hand motions for operating the control within the working range. The working ranges may be learned by the CAN data propagator using training data, and/or overtime over several iterations.

Figure 8:
FIG. 8 an example annotated image illustrating an example interaction between an extremity and a vehicle control.

FIG. 8 depicts an example annotated image 800 illustrating an example extremity 804 and vehicle control 802. In this example, the vehicle control 802, a panel button, is pressed. Responsive to receiving a signal via the CAN bus indicating depression of the button, the CAN data propagator 242 anticipates a hand will be depicted in a nearby region in the image data 306. More particularly, through decoding of the CAN bus data, the CAN data propagator 242 is aware that the control panel button was pressed, and attributes a higher probability to an extremity proposal 804 appearing in the image data in a location proximate the button 802.

Figure 10:
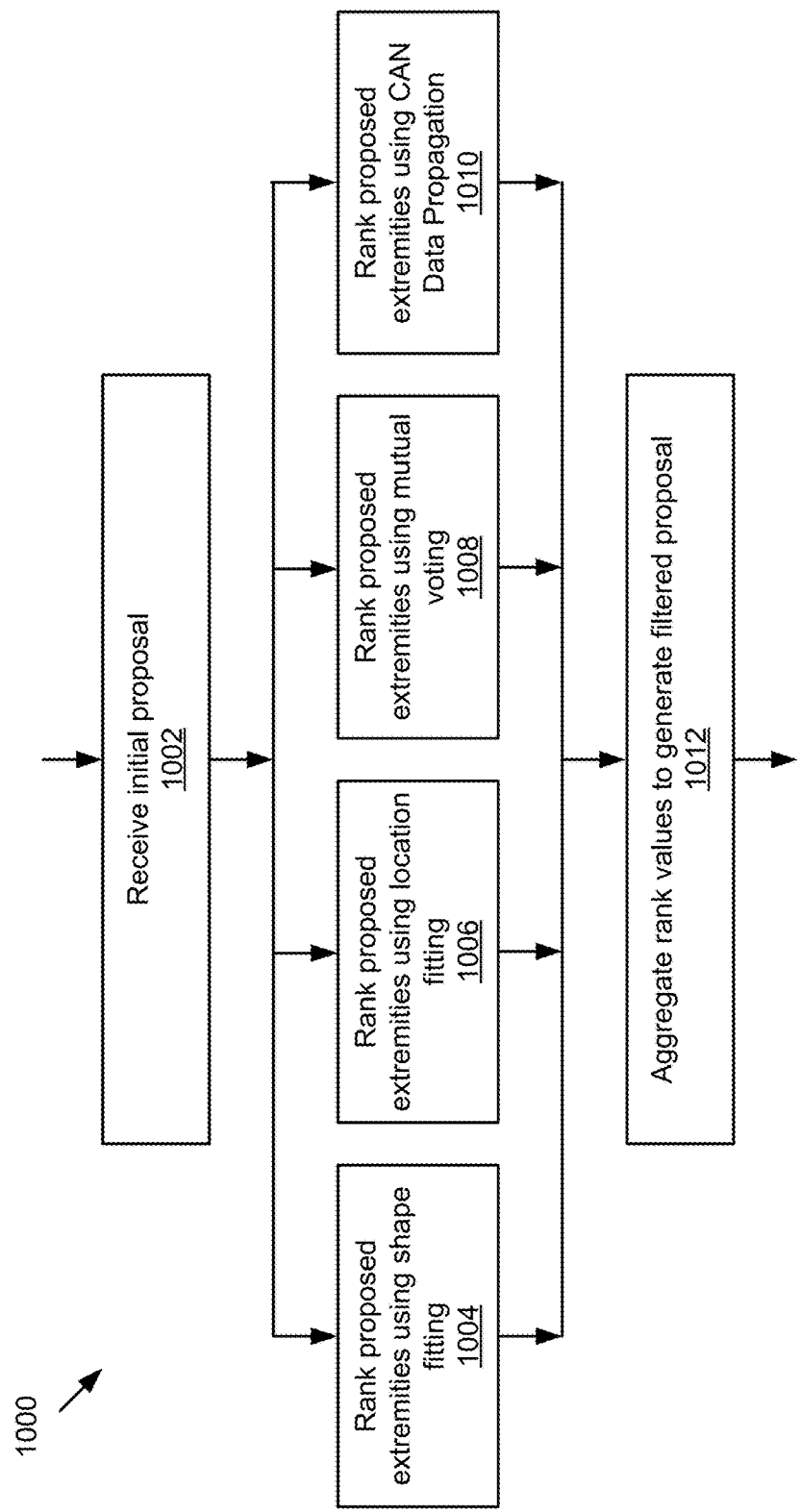
FIG. 10 is a flowchart of an example method for scoring proposed extremities.

Each of the context processors 236, 238, 240, and 242 may output a confidence score, and the confidence aggregator 244 aggregates each of these confidence scores and computes an overall aggregated score. FIG. 10 is a flowchart of an example method 1000 for scoring proposed extremities. In block 1002, the method 1000 receives an initial extremity proposal including proposed extremities detected from an image captured by one or more sensors 120. In block 1004, the extremity-shape fitter 236 ranks the proposed extremities based on the dimensions of the proposed extremities. In block 1006, the extremity location filterer 238 ranks the proposed extremities based on the locations of the proposed extremities within the image. In block 1008, the extremities voter 240 ranks the proposed extremities using mutual voting. In block 1010, the CAN data propagator 242 ranks the proposed extremities responsive to receiving CAN data indicating presence(s) of one or more proposed extremities in the location proximate a control associated with the CAN data. The ranking performed by the extremity-shape fitter 236 in a first instance, the extremity location filterer 238 in a second instance, the extremities voter 240 in a third instance, and the CAN data propagator 242 in a fourth instance, may be performed in series and/or parallel, and may be reflected as confidence values output to the confidence aggregator 244, and in block 1012, the confidence aggregator 244 may aggregate the confidence values for each of the proposed extremities and output a filtered proposal 312.

The filtered proposal 312 may include a subset of extremities, such as extremities having aggregated confidence values meeting predetermined thresholds and/or falling within a predetermined range. As a further example, the filtered proposal 312 may include a set of rectangular bounding box coordinates and the aggregated confidence scores.

In some embodiments, the predetermined thresholds may be fixed, or may be adapted over time based on learning performed by and/or trends computed by the confidence aggregator 244. Further, the thresholds may be global, individualized, or applied based on a classification (driver type, driver size and shape categories, etc.). In some embodiments, the extremities may be filtered based on a historical distribution. For instance, aggregated confidences respectively associated with the extremities may be compared with an average confidence value, and those falling outside a certain envelope, such 1, 1.5, 2, etc., standard deviations from the average value may be filtered out.

In some embodiments, the confidence aggregator 244 may fuse the confidences from the various channels optimally. For each proposed bounding box bb, there may be an original ACF score $S_{ACF}$, a bb shape fitting score $S_{bbs}$, a spatial filtering score $S_{spatial}$, and a joint spatial distribution score $S_{joint}$. The confidence aggregator 244 may calculate an optimal weight to combine these four scores using the following formula: $S=\alpha_1 S_{ACF}+\alpha_2 S_{bbs}+\alpha_3 S_{spatial}+\alpha_4 S_{joint}$. It should be understood that other combinations of the scores are also contemplated (e.g., two, three, of the forgoing scores). In some cases, a random search technique may be used. For instance, the forgoing four weights may be randomly initialized following a uniform distribution ($\alpha_i \sim u(0, 0.5)$). For each iteration, the step size may also follow a uniform distribution ($\delta\alpha_i \sim u(-0.1, 0.1)$). The weight may be updated whenever an improvement in performance is observed after the step jump. The random search process may cease either after reaching a threshold of iterations or after reaching a performance plateau. As an example, the random initialization was repeated ten times and the weight achieving the best performance was chosen as the final optimal weight.

In some embodiments, the confidence aggregator 244 may use a GMM to model the bounding box data in filtered proposal. For instance, the confidence aggregator 244 may perform the modeling using the following equation $p(\theta)=\Sigma_{i=1}^{K}\phi\mathcal{N}(\mu_i,\Sigma_i)$.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
    receiving image data from one or more sensors of a moving platform monitoring a dynamic environment;
    detecting one or more objects from the image data, the one or more objects potentially representing one or more extremities of a user associated with the moving platform;
    processing the one or more objects using two or more context processors and context data retrieved from a context database, the context data reflecting a context associated with each of the one or more objects in the dynamic environment, the processing producing at least two confidence values for each of the one or more objects, each context processor of the two or more context processors being one of:
    a processor executable to fit a bounding box to each of the one or more objects and determine a confidence value for each of the one or more objects based on the bounding box;
    a processor executable to determine a confidence value for each of the objects based on a location of each of the objects within the image data;
    a processor executable to determine a confidence value for each of the objects using mutual voting; and
    a processor executable to determine a confidence value for each of the objects based on controller area network (CAN) data received at time corresponding to the image data; and
    filtering at least one of the one or more objects as representing an extremity of the user based on the at least two confidence values of each of the one or more objects.

2. The computer-implemented method of claim 1, further comprising:
    estimating a sensor location associated with the one or more sensors from the image data; and
    retrieving the context data from the context database using the sensor location.

3. The computer-implemented method of claim 2, wherein estimating the sensor location includes:
    extracting color features and texture features from the image data;
    using a discriminative model to determine one or more location probabilities for the one or more objects; and
    determining the sensor location based on the one or more location probabilities.

4. The computer-implemented method of claim 3, wherein the sensor location includes a probability for a sensor position.

5. The computer-implemented method of claim 1, further comprising:
    refining a location of the bounding box associated with an unfiltered object.

6. The computer-implemented method of claim 1, wherein filtering the at least one of the one or more objects includes:
    computing an aggregated confidence value for each of the one or more objects using the at least two confidence values for each of the one or more objects; and
    comparing the aggregated confidence value of each of the one or more objects to a predetermined threshold.

7. The computer-implemented method of claim 1, further comprising:
    providing one or more of an auditory instruction, a visual instruction, and a tactile instruction to the user via one or more output devices of the moving platform based on an output determined based on the filtering.

8. A computer-implemented method comprising:
    receiving an initial extremity proposal including proposed extremities detected from an image captured by one or more sensors;
    ranking, in a first instance, the proposed extremities based on dimensions of the proposed extremities;
    ranking, in a second instance, the proposed extremities based on locations of the proposed extremities within the image;
    ranking, in a third instance, the proposed extremities using mutual voting;
    ranking, in a fourth instance, the proposed extremities responsive to receiving a controller area network (CAN) data associated with at least one of the proposed extremities;
    aggregating confidence values associated with the ranking of the first instance, the second instance, the third instance, and the fourth instance; and
    outputting a filtered proposal including a subset of the proposed extremities based on the aggregated confidence values.

9. A system comprising:
    one or more processors;
    one or more memories storing instructions that, when executed by the one or more processors, cause the system to perform operations comprising:
    receiving image data from one or more sensors of a moving platform monitoring a dynamic environment;
    detecting one or more objects from the image data, the one or more objects potentially representing one or more extremities of a user associated with the moving platform;

processing the one or more objects using two or more context processors and context data retrieved from a context database, the context data reflecting a context associated with each of the one or more objects in the dynamic environment, the processing producing at least two confidence values for each of the one or more objects, each context processor of the two or more context processors being one of:
a processor executable to fit a bounding box to each of the one or more objects and determine a confidence value for each of the one or more objects based on the bounding box;
a processor executable to determine a confidence value for each of the objects based on a location of each of the objects within the image data;
a processor executable to determine a confidence value for each of the objects using mutual voting; and
a processor executable to determine a confidence value for each of the objects based on controller area network (CAN) data received at time corresponding to the image data; and
filtering at least one of the one or more objects as representing an extremity of the user based on the at least two confidence values of each of the one or more objects.

10. The system of claim 9, wherein the instructions, when executed by the one or more processors, further cause the system to perform operations comprising:
estimating a sensor location associated with the one or more sensors from the image data; and
retrieving the context data from the context database using the sensor location.

11. The system of claim 10, wherein estimating the sensor location includes:
extracting color features and texture features from the image data;
using a discriminative model to determine one or more location probabilities for the one or more objects; and
determining the sensor location based on the one or more location probabilities.

12. The system of claim 11, wherein the sensor location includes a probability for a sensor position.

13. The system of claim 9, wherein the instructions, when executed by the one or more processors, further cause the system to perform operations comprising:
refining a location of the bounding box associated with an unfiltered object.

14. The system of claim 9, wherein filtering the at least one of the one or more objects includes:
computing an aggregated confidence value for each of the one or more objects using the at least two confidence values for each of the one or more objects; and
comparing the aggregated confidence value of each of the one or more objects to a predetermined threshold.

15. The system of claim 9, wherein the instructions, when executed by the one or more processors, further cause the system to perform operations comprising:
providing one or more of an auditory instruction, a visual instruction, and a tactile instruction to the user via one or more output devices of the moving platform based on an output determined based on the filtering.

* * * * *